United States Patent [19]
LaDue

[11] Patent Number: 5,845,203
[45] Date of Patent: *Dec. 1, 1998

[54] REMOTE ACCESS APPLICATION MESSAGING WIRELESS METHOD

[75] Inventor: Christoph Karl LaDue, Santa Cruz, Calif.

[73] Assignee: Aertis Cormmunications, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 591,035

[22] Filed: Jan. 25, 1996

[51] Int. Cl.⁶ .............................. H04Q 7/20; H04Q 7/22; H04Q 7/00

[52] U.S. Cl. .......................... 455/414; 455/466; 370/494; 370/522

[58] Field of Search ...................................... 455/403, 410, 455/414, 427, 464, 466, 31.2, 31.3, 557, 550, 552, 560; 364/412; 463/19; 370/496, 522

[56] References Cited

U.S. PATENT DOCUMENTS

| | | |
|---|---|---|
| H610 | 3/1989 | Focarile et al. . |
| Re. 34,496 | 1/1994 | Franklin et al. . |
| 3,937,892 | 2/1976 | Bloch et al. ........................ 179/15 AL |
| 3,976,995 | 8/1976 | Sebestyen . |
| 4,176,254 | 11/1979 | Tuttle et al. . |
| 4,245,340 | 1/1981 | Landry . |
| 4,254,404 | 3/1981 | White . |
| 4,375,637 | 3/1983 | Desjardins . |
| 4,575,621 | 3/1986 | Dreifus . |
| 4,633,464 | 12/1986 | Anderson . |
| 4,654,867 | 3/1987 | Labedz et al. . |
| 4,675,656 | 6/1987 | Narcisse . |
| 4,713,808 | 12/1987 | Gaskill et al. ............................ 370/94 |
| 4,750,197 | 6/1988 | Denelamp ................................. 379/58 |
| 4,809,316 | 2/1989 | Namekawa . |
| 4,821,309 | 4/1989 | Namekawa . |
| 4,825,457 | 4/1989 | Lebowitz ................................... 379/40 |
| 4,831,371 | 5/1989 | Hess ................................... 340/825.03 |
| 4,856,047 | 8/1989 | Saunders . |
| 4,860,341 | 8/1989 | D'Arello et al. . |
| 4,866,422 | 9/1989 | Dunnett et al. . |
| 4,905,271 | 2/1990 | Namekawa . |
| 4,924,211 | 5/1990 | Davies . |
| 4,965,820 | 10/1990 | Sharpe et al. . |

(List continued on next page.)

OTHER PUBLICATIONS

Sarnecki, J. et al. Microcell Design Principles: all, IEEE Comm. Apr. 1993.

Forcarile, et al. Cellular Paper, 1–9 pg: Statuatory Inv. Reg. H610 Mar. 7, 1989.

Roach, et al. "Methods and Apparatus For Communicating via A Cellular Network Control Channel", All: PCT International Application, WO95/24791, 14 Sep. 1995.

*Primary Examiner*—Dwayne D. Bost
*Assistant Examiner*—Keith Ferguson
*Attorney, Agent, or Firm*—Blakely Sokoloff Taylor & Zafman, LLP

[57] ABSTRACT

A method for seamlessly transmitting application specific messages over cellular radio system control channels and switches, including the steps of: transmitting application specific messaging bits, configured to appear as origination data packets having from eight to thirty-two digit fields, utilizing control channels, remote feature control request features, and IS-41 protocols. The messaging bits are transmitted over cellular control channels, for example, an AMPS, D-AMPS and TACS FSK modulated reverse control channel (RECC) 10 Kbps 48 word BCH hamming coded control channel. The messaging bits are then applied to communicate with, identify, monitor, and locate the application specific system, thereby allowing for an integrated application specific two-way communications system. The application specific system may comprise a two-way paging system, a motor vehicle location status system, a motor personal location status system, a home arrest status system, a security system, a utility meter reading status and the like.

31 Claims, 12 Drawing Sheets

U.S. PATENT DOCUMENTS

| | | | |
|---|---|---|---|
| 5,005,014 | 4/1991 | Jusinski | 340/825.44 |
| 5,016,269 | 5/1991 | Rogers . | |
| 5,023,901 | 6/1991 | Sloan et al. . | |
| 5,027,383 | 6/1991 | Shefer | 379/39 |
| 5,030,940 | 7/1991 | Siikarla . | |
| 5,048,015 | 9/1991 | Zilberfarb . | |
| 5,055,851 | 10/1991 | Sheffer . | |
| 5,077,830 | 12/1991 | Mallia . | |
| 5,093,927 | 3/1992 | Shanley . | |
| 5,113,427 | 5/1992 | Ryoichi et al. . | |
| 5,119,397 | 6/1992 | Dahlin et al. . | |
| 5,122,959 | 6/1992 | Nathanson et al. . | |
| 5,153,582 | 10/1992 | Davis . | |
| 5,153,903 | 10/1992 | Eastmond et al. . | |
| 5,155,689 | 10/1992 | Wortham . | |
| 5,170,426 | 12/1992 | D'Alessio et al. . | |
| 5,204,670 | 4/1993 | Stinton . | |
| 5,212,636 | 5/1993 | Nakazawa . | |
| 5,235,598 | 8/1993 | Sasuta . | |
| 5,235,633 | 8/1993 | Dennison et al. . | |
| 5,239,294 | 8/1993 | Flanders et al. . | |
| 5,239,678 | 8/1993 | Grube et al. . | |
| 5,239,680 | 8/1993 | Grube et al. . | |
| 5,241,598 | 8/1993 | Raith . | |
| 5,255,306 | 10/1993 | Melton et al. . | |
| 5,274,368 | 12/1993 | Breeden . | |
| 5,276,728 | 1/1994 | Paglinareli et al. . | |
| 5,280,426 | 1/1994 | Edmonds . | |
| 5,295,178 | 3/1994 | Nickel et al. . | |
| 5,307,509 | 4/1994 | Michalon et al. . | |
| 5,325,419 | 6/1994 | Connolly et al. . | |
| 5,327,478 | 7/1994 | Lebowitz . | |
| 5,335,278 | 8/1994 | Matchett . | |
| 5,337,345 | 8/1994 | Cassidy et al. . | |
| 5,341,410 | 8/1994 | Aron et al. . | |
| 5,343,493 | 8/1994 | Karlmullah . | |
| 5,355,511 | 10/1994 | Hatano et al. . | |
| 5,357,254 | 10/1994 | Kah, Jr. . | |
| 5,359,182 | 10/1994 | Schilling . | |
| 5,365,516 | 11/1994 | Jandrell . | |
| 5,377,193 | 12/1994 | Grube et al. . | |
| 5,392,451 | 2/1995 | Schwendeman . | |
| 5,396,539 | 3/1995 | Slekys et al. . | |
| 5,396,653 | 3/1995 | Kivari et al. . | |
| 5,400,018 | 3/1995 | Scholl et al. . | |
| 5,404,355 | 4/1995 | Raith . | |
| 5,410,737 | 4/1995 | Jones | 455/56.1 |
| 5,420,911 | 5/1995 | Pahlin et al. | 379/59 |
| 5,422,626 | 6/1995 | Fish . | |
| 5,432,495 | 7/1995 | Tompkins . | |
| 5,432,841 | 7/1995 | Rimer . | |
| 5,446,759 | 8/1995 | Campana, Jr. . | |
| 5,448,760 | 9/1995 | Frederick et al. . | |
| 5,448,773 | 9/1995 | McBurney et al. . | |
| 5,465,387 | 11/1995 | Mukherjee . | |
| 5,473,667 | 12/1995 | Neustein . | |
| 5,483,465 | 1/1996 | Grube et al. . | |
| 5,497,412 | 3/1996 | Lannen et al. | 455/414 |
| 5,513,183 | 4/1996 | Kay et al. . | |
| 5,525,967 | 6/1996 | Azizi et al. . | |
| 5,525,969 | 6/1996 | LaDue . | |
| 5,526,357 | 6/1996 | Jandrell . | |
| 5,526,401 | 6/1996 | Roach, Jr. et al. . | |
| 5,537,102 | 7/1996 | Pinnow . | |
| 5,539,810 | 7/1996 | Kennedy, III et al. . | |
| 5,544,225 | 8/1996 | Kennedy, III et al. . | |
| 5,546,444 | 8/1996 | Roach, Jr, et al. | 455/403 |
| 5,556,102 | 9/1996 | Huang . | |
| 5,559,312 | 9/1996 | Lucero . | |
| 5,563,931 | 10/1996 | Biship et al. . | |
| 5,566,236 | 10/1996 | Melampy et al. | 455/403 |
| 5,568,119 | 10/1996 | Schipper et al. . | |
| 5,569,083 | 10/1996 | Fioretti . | |
| 5,573,244 | 11/1996 | Mindes . | |
| 5,577,103 | 11/1996 | Foti | 455/466 |
| 5,592,535 | 1/1997 | Klotz . | |
| 5,594,740 | 1/1997 | LaDue . | |
| 5,610,969 | 3/1997 | Mchenry et al. | 455/414 |
| 5,611,730 | 3/1997 | Weiss . | |
| 5,664,005 | 9/1997 | Emery et al. | 455/414 |
| 5,771,455 | 6/1998 | Kennedy, III et al. | 455/456 |

FIG. 10

| H[1] | D | WORD | ORIG | C-ADDR | AT&T SW | | | |
|------|---|------|------|--------|---------|---|---|---|
| 0 001 | | 0000 | 0010 | 0001 | 1000 | 0000 | 0011 | 0101 | 1001 |
| F NAWC | | DIG1 | DIG2 | DIG3 | DIG4 | DIG5 | DIG6 | DIG7 | DIG8 |
| 3 | | A | 9 | 4 | 1 | 2 | 3 | 5 | 9 |

280

| H[1] | D | WORD | ORIG | C-ADDR | MOTOROLA SW | | | |
|------|---|------|------|--------|-------------|---|---|---|
| 0 001 | | 0000 | 0010 | 0001 | 1000 | 0000 | 0011 | 0101 | 1001 |
| F NAWC | | DIG1 | DIG2 | DIG3 | DIG4 | DIG5 | DIG6 | DIG7 | DIG8 |
| 3 | | A | 8 | 3 | 6 | 2 | 3 | 5 | 9 |

281

| H[1] | D | WORD | ORIG | C-ADDR | NORTELL SW | | | |
|------|---|------|------|--------|------------|---|---|---|
| 0 001 | | 0000 | 0010 | 0001 | 1000 | 0000 | 0011 | 0101 | 1001 |
| F NAWC | | DIG1 | DIG2 | DIG3 | DIG4 | DIG5 | DIG6 | DIG7 | DIG8 |
| 3 | | A | 6 | 3 | 7 | 2 | 3 | 5 | 9 |

282

| H[1] | D | WORD | ORIG | C-ADDR | SIEMANS SW | | | |
|------|---|------|------|--------|------------|---|---|---|
| 0 001 | | 0000 | 0010 | 0001 | 1000 | 0000 | 0011 | 0101 | 1001 |
| F NAWC | | DIG1 | DIG2 | DIG3 | DIG4 | DIG5 | DIG6 | DIG7 | DIG8 |
| 3 | | A | 7 | 9 | 3 | 2 | 3 | 5 | 9 |

283

| H[1] | D | WORD | ORIG | C-ADDR | ERRICSON SW | | | |
|------|---|------|------|--------|-------------|---|---|---|
| 0 001 | | 0000 | 0010 | 0001 | 1000 | 0000 | 0011 | 0101 | 1001 |
| F NAWC | | DIG1 | DIG2 | DIG3 | DIG4 | DIG5 | DIG6 | DIG7 | DIG8 |
| 3 | | A | 7 | 4 | 1 | 2 | 3 | 5 | 9 |

284

240, 173, 276, 277, 278, 279

REMOTE ACCESS APPLICATION MESSAGING WIRELESS METHOD

BACKGROUND OF THE INVENTION

1. Field of the Invention

The present invention relates to wireless data communications networks such as cellular, paging and satellite networks that support two way paging and other two way messaging services. More specifically, the invention utilizes a wide range of wireless communications systems generically known as cellular mobile radio systems, paging communications systems, and satellite network systems for remote access application messaging.

2. Description of Related Art

A variety of operation standards, methods, and apparatuses have been proposed in recent years for enabling two way data communication services. Cellular and paging companies such as Pageant, Skytel, Pagemart and others offer various means and methods for two way paging and two way messaging. So far, however, all of these proposed systems are inefficient, cumbersome, and expensive. For example, services offered include store-and-forward voice services. Such methods require the user to speak into a pager, store the voice, send it, and then it is fed to the recipient. Other methods utilize narrow band personal communications standards (NPCS). Still other two way paging and two way short messaging methods utilize cellular wireless operations standards broadly known as Personal Communications Systems (PCS), Global System for Mobile (GSM), DCT-1800, DCT-1900, 900 Mhz GSM, and Enhanced Specialized Mobile Radio (ESMR). Typically such wireless radio communications methods offer various value added bearer services.

The present invention provides a precise and controlled application data packet method that logically creates a separate but compatible continuous control application data protocol (CCAD) to existing cellular access protocols. These services include two way digital voice services, two way point-to-point short messaging, broadcast messages, voice mail, single number access and the means and methodology of creating a two way paging and short messaging system that establishes an additional function to cellular system access, and remote access feature control procedures that are very simple and efficient, and inexpensive to implement. The application data routine of the invention becomes a normal part of cellular system data management and remote feature access control management while providing a cost effective, highly flexible, and elegantly simple two way paging solution that is easy-to-use, profitable to the cellular carrier, and affordable and practical for the consumer. Additionally, the present invention creates a virtual communications system by merging three distinctly differently communications mediums that are currently in operation today; cellular control channels, one way broadcast paging, and signaling system SS7, X.25, and other frame relay, packet switched and circuit switched network technologies.

SUMMARY OF THE INVENTION

Accordingly, it is the primary object of the present invention, to provide the means and methodology for a two way short messaging communications system that utilizes and combines the data communications protocols of existing cellular network control channels, remote feature control access procedures, one way broadcast paging networks, BCCH broadcast, DCCH forward cellular TDMA messaging and signaling system seven SS7 protocols. The methodology is applicable on all cellular mobile radio networks including American Mobile Phone System (AMPS), Total Access Communications System (TACS), personal communications systems (PCS) and Global System for Mobile (GSM) networks.

It is another object of the present invention to provide specialized data protocols that operate seamlessly and without having to modify existing network cellular and paging network infrastructure. Furthermore, the present invention will dramatically reduce the direct cost of implementing a wide spectrum of control channel application data CCAD two way short messaging services that up until now forced wireless network operators to spend millions of dollars to implement inefficient and costly data packet systems that support very limited and expensive two way data communications systems. The present invention provides a novel and elegantly simple solution for implementing efficient, flexible and low cost two way data short messaging communications that include the seamless integration of cellular control channels and cellular switch remote feature control access request methods as detailed in interim standards, IS-553, IS-54B, IS-95, IS-661, IS-136, and IS41.3-B 3.8 to 4.3.1, making possible a virtual application specific two way smart data messaging system. The method provides an efficient and low cost approach to two way paging, certified paging, smart paging, location paging, fleet management, motor vehicle anti-theft, anti fraud protection, home arrest, keep away monitoring, medical alert services, personal protection 911 services, law enforcement personnel management, remote sensor monitoring, utility meter reading, and other such services.

The present invention also provides an efficient communications pathway for Global Positioning System (GPS) data management, dead reckoning, Loran C data communications, and other location data management services currently under development. It is another object of the invention to provide new data protocols that seamlessly fit within the existing access, signaling and control channel protocols used for cellular and paging networks without causing disruption to existing cellular and paging network voice traffic, data traffic operations, and normal control channel routines. Furthermore, the present invention does not significantly impact any host cellular and paging system capacity. In fact, the present invention in no way causes any switching and network capacity problems, it is essentially a stand-alone virtual control channel application data communications and signaling method, and does not need to utilize any major processing capacity of the cellular switch. However, the method of the present invention can be adapted and fully integrated with all mobile switching center (MSC) switching and processing schemes operating and manufactured in the world today. This is accomplished with simple switch operations software programming and man-machine interface commands. These procedures allow for the recognition, processing, and routing of control channel application data (CCAD) data packets contained within RECC reverse control channel origination access packets that use dialed digit four bit fields to transport non-dialed automatically derived encoded and non-encoded application specific data information. Preferably the remote access feature control code is not entered by the user. Instead, the present invention provides an automatic means and method to send specialized activation codes to activate unique switch routing instruction procedures that provide for a transparent access to the master central monitoring stations (MCMS) unique data management systems present on the X.25 and SS7 signaling network. This seemingly slight but important software and command structure revision maximizes system efficiency while at the time minimizing any impact upon overall cellular system capacity. The present method adds application specific data words in a distinct and precise way. First, the method utilizes dialed number fields contained in cellular D, E, F and G RECC reverse control channel 48 bit words that are contained within multiword RECC data packets that transport user information contained within called address origination protocols processed during conventional remote feature control access request dialed digit code analysis, equipment registration protocols, home location register (HLR) access protocols, visitor location register (VLR) access protocols, and other system management and signaling protocols. Secondly, a distinct application specific data protocol is created that is transparent and transportable over existing analog and digital physical access channels used by all cellular standards in the world today. Thirdly, a separate and distinct data protocol is provided that is compatible and completely transparent with existing origination procedures and remote feature control access request procedures, paging network procedures and SS7 protocols procedures, but completely different in terms of intent, usage, and end result including transmitting, processing and transporting the application specific data.

The present invention creates a totally new approach to short packet messaging system management by adding new service related functions to system access, origination, autonomous registration, remote feature control access procedures and other management methods without having to revise current cellular, paging and SS7 operations standards. In fact the present methodology requires no Federal Communications Commissions (FCC) approval. The aforementioned physical and logical channel protocols are transmitted from CCAD communications terminals to cellular system base stations, mobile switching centers (MSC), and subsequently relayed and routed via SS7 links to a master central monitoring station (MCMS). These data words are created and transmitted by core application specific communicators and terminals for the purpose of sending two way messaging responses either in a pre-determined form or by utilizing a terminal keypad to send highly variable and individual text multi-character responses contained in conventional dialed digit D through G word fields, herein designated H words, by the present method for application specific purposes. Other data that can be sent include global positioning system (GPS) correlative reference data bits, dead reckoning, and Loran C data and other terminal, and/or application specific device status bits to master central monitoring stations (MCMS), that may process and relay said data words to individual system facilitators, service bearers and end users.

The present invention offers unique interface protocols that are programmed to provide a transparent integration of these device status bits, with physical and logical control channel and access channel bit fields that are normally used by analog and digital cellular terminals for host cellular system access, registration, origination, frequency assignment and other related physical and logical control channel and access channel processes. In fact, the disclosed application specific status bit fields are sent simultaneously with standard physical and logical control channel and access channel information bits contained in origination dialed four bit digit fields and are virtually transparent to the host cellular system.

Accordingly it is a further object of the present invention to provide both the means and method of reading and processing these special application specific data words at the mobile switching centers (MSC) and master central monitoring station (MCMS) without further taxing host cellular air-interface system and switch resource capacity. These special application specific data fields contained in the dialed digit spaces are part of an origination access procedure. They are received, scanned, and analyzed during the conventional Remote Feature Control Access Procedure embedded at the mobile switching center (MSC), and then routed to master central monitoring facilities via an SS7 link. The preferred method converts this remote feature access procedure into a Remote Access Application Messaging system (RAAM). This application specific data is received, analyzed, and processed. Then the appropriate instruction set and the command or message is sent to paging network control centers and service bearer centers for direct interaction with a variety of end user application specific apparatuses via the PSTN, or SS7, X.25, DID links to paging, and the like.

Furthermore, the present invention provides for full duplex communications by fully integrating cellular transceivers and paging receivers that communicate together within specially designed end user CCAD communications terminals. Special instructional or command messages are sent from the Master Central Monitoring Station (MCMS) by electronic and man-machine interface terminals via the PSTN/PLMN and SS7 link networks to designated paging network controllers and paging transmission towers. In turn these instructional and command messages are subsequently transmitted to one or many CCAD communications terminals. Once the CCAD communications terminal receives the special command, instructional, or human syntax displayed alpha numeric message, it is programmed to automatically respond by processing and recognizing the significance of the particular command message received from the paging network, or visually instructs the user via a liquid crystal display LCD screen to perform a function, and then transmits the response over physical and logical control channels and signaling and access channels of host cellular networks, in the heretofore described manner.

The present invention also enables a new user locating feature to one way paging networks. By combining cellular network signaling characteristics with paging network signaling methods a new communication system feature is implemented. For example, when a cellular mobile station registers, its authentication data is relayed to the home location register (HLR) of the mobile stations home cellular serving system. The present invention also utilizes its own HLR type service control point (SCP) data management system, located at its master central monitoring station (MCMS). An HLR typically contains authentication data including the most current system location of every paying user listed in that system. Every time a CCAD user registers and sends a CCAD-RAAM data packet to the, MCMS HLR via the SS7, and/or X.25 link, it updates his serving system location and sends an appropriate response to the serving MSC. For example if the CCAD user is located in New York City and the MCMS is located in California, and the user registers, the New York mobile switching center will send that information to the MCMS via the SS7 network. When a CCAD application bearer facility needs to send a page or command to the CCAD user, a message is sent to the MCMS via the PSTN. Once the page query is received, the MCMS data processing terminals automatically interrogate the MCMS HLR/data base, verify the CCAD users most current location and send the page via the host paging networks processing switches, network controllers and transmission towers located in that same cellular serving area. The present inventions MCMS utilizes paging network routing and specific system location tables, routing and parameter tables and other related information to send pages and paged commands on a national basis, but with the added advantage of utilizing a local paging networks system and capacity. Therefore, a CCAD user can sign up for national service, but only pay for local user costs. This method also enables small local paging networks to become part of a nationally deployed system without being physically connected with other paging systems, the MCMS connects paging networks and cellular networks together. The method described herein facilitates location services for one way paging network that heretofore were impossible to provide with any modicum of efficiency. This method saves a huge amount of paging network capacity. With the present method it is no longer necessary to send national, and large area regional pages to complete a paging transaction designated for one paging customer. If a customer utilizes a CCAD communicator that combines cellular and one way paging, this important utility will be enabled. CCAD provides the means and method for paging networks to operate globally while concentrating on local serving system operations.

Another important feature of the present invention is its ability to provide accurate message accounting, in that each CCAD-RAAM data packet is considered an individual transaction, therefore the bearer facilitator is charged for only the CCAD two way data packet sent, not for a blanket cellular per minute charge.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiments given below, serve to explain the principles of the invention.

FIG. 10 is a diagrammatic chart of the CCAD-RAAM application message encoding method, according to the invention.

DETAILED DESCRIPTION OF THE PREFERRED EMBODIMENTS OF THE INVENTION

Reference will now be made in detail to the present preferred embodiments of the invention as illustrated in the accompanying drawings. In describing the preferred embodiments and applications of the present invention, specific terminology is employed for the sake of clarity. However, the invention is not intended to be limited to the specific terminology so selected, and it is understood that each specific element includes all technical equivalents which operate in a similar manner to accomplish a similar purpose.

In accordance with the invention there is provided a method for seamlessly transmitting application specific messages over cellular radio system control channels and switches, comprising: transmitting application specific messaging bits as a data packet configured to appear as an origination data packet having from eight to thirty two digit fields containing data related to an application specific system utilizing control channel means and cellular switch remote feature access control request means using IS-41 remote feature access protocols; transmitting the messaging bits over cellular control channels utilizing AMP, D-AMPS and TACS, FSK modulated reverse control channel RECC 10 Kbps 48 word BCH hamming coded control channel means; and applying the messaging bits to communicate with, identify, monitor, and locate said application specific system, thereby allowing for an integrated application specific two-way communications system.

Figure 1A:
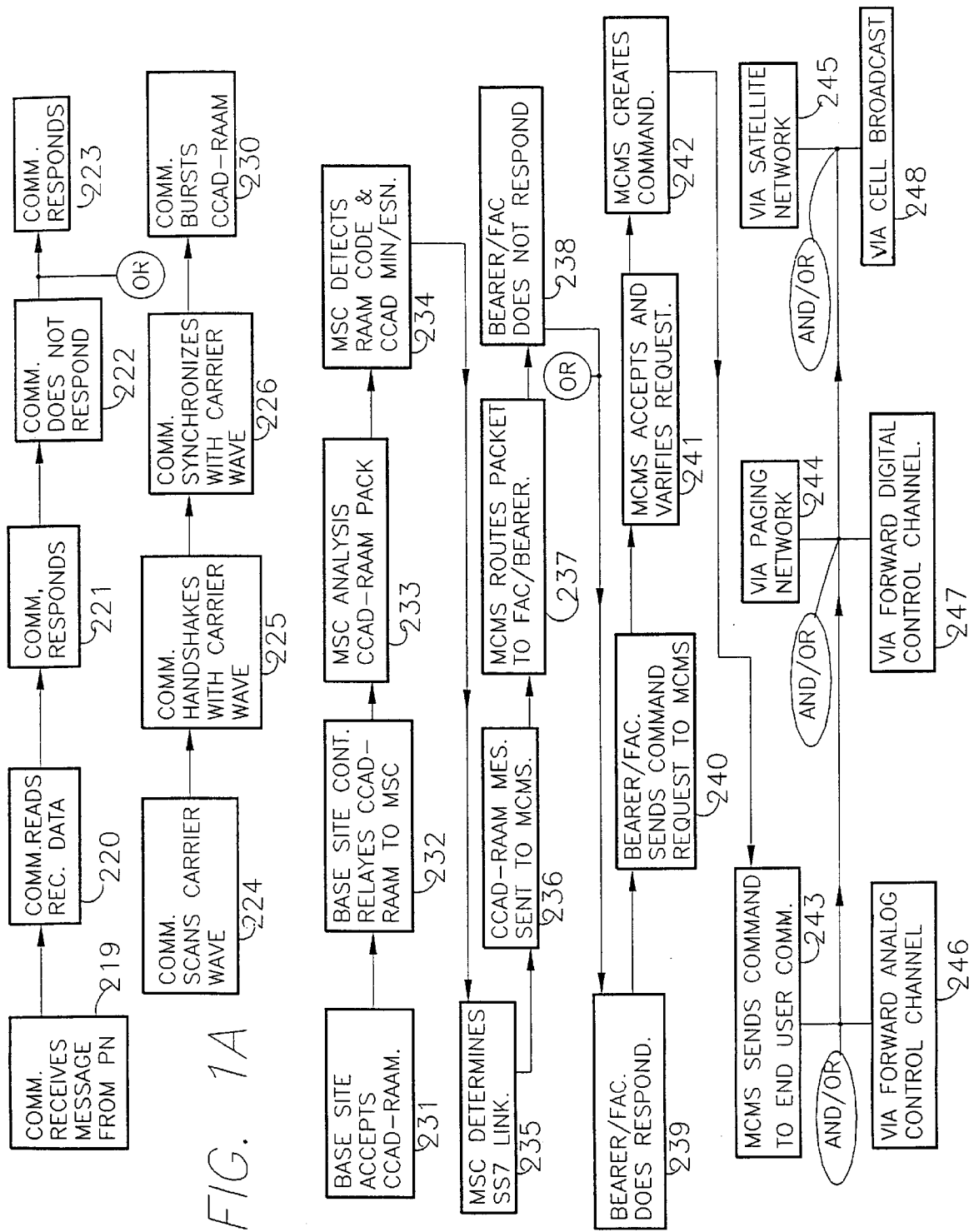
FIG. 1A is a logical block diagram of the CCAD communications protocol according to the invention.

There is also provided, in accordance with the invention a method for converting data within an control channel application specific communicator configured as a integrated paging network receiver and cellular network control channel application specific transmitter, comprising: receiving data commands and instructions from a paging network; processing the data commands and instructions; and transmitting automatically application specific data status messages as a data packet configured to appear as an origination packet having from eight to thirty-two digit fields over AMPS, DAMPS and TACS FSK modulated reverse control channel RECC 48 bit BCH hamming coded control channels utilizing compatible control channel protocols and IS-41 remote feature access protocols, allowing for an integrated application specific two-way communications system utilizing existing cellular radio networks and paging networks, thereby creating a control channel application data virtual communications system Referring to FIG. 1A, a preferred methodology is shown where a CCAD communicator receives a message from a paging network 219, and the CCAD communicator reads a received paging message 220. Communicator 100 evaluates the message, whether its an alpha/numeric message or coded instructional message 221, and responds, or does not respond 222, to the received message from paging network 219. The CCAD communicator preferably does not communicate to the CCAD virtual network if there is no reason in terms of differentiation of communicator internal system status. If the CCAD communicator needs to respond 223 to a paging network message it creates a record, scans the cellular forward analog control channel or forward digital control channel carrier radio wave 224, handshakes with forward channel carrier wave 225, either digital or analog, and then synchronizes with the analog or digital air interface protocol 226. Once synchronization and handshaking is complete, the CCAD communicator bursts its CCAD-RAAM analog or digital data packet 230. The base site preferably accepts CCAD-RAAM data packet 231, and relays a CCAD-RAAM data packet to mobile switching center MSC 232. The mobile switching center (MSC) then analyzes the CCAD-RAAM data packet 233. The MSC processes the packet by detecting a specialized data only RAAM code and CCAD-RAAM mobile identification number (MIN) and electronic serial number (ESN) 234. Once detected and recognized, the MSC determines the CCAD-MCMS SS7 link destination instruction code that results from decoding the specialized non-voice MIN and ESN 235, and sends the packet over that designated SS7 link 235, and it is received at the master central monitoring station (MCMS) 236. Once the data packet is processed, the MCMS routes the data packet to the bearer facility 237. The bearer facility evaluates the status of the bits contained within the packet, and chooses either not to respond 238, or to respond 239, by sending a command request to the MCMS 240 via the PSTN T1 or dial in direct (DID) via normal telephone lines. The MCMS then receives, accepts and verifies the command request 241. The MCMS then creates the command data packet 242, and subsequently sends command data packet to the CCAD communicator 243 via paging network 244, and/or via satellite network 245, and/or via forward analog control channel FOCC 246, and/or via forward digital control channel DCCH 247, and or via cell site broad cast channel BCCH 248. This aforementioned protocol process operates in this general manner with all cellular air interface and network standards. Additional component parts and operational procedures of the CCAD-RAAM virtual network are depicted in FIG. 1B, the explanation is as follows.

Figure 1B:
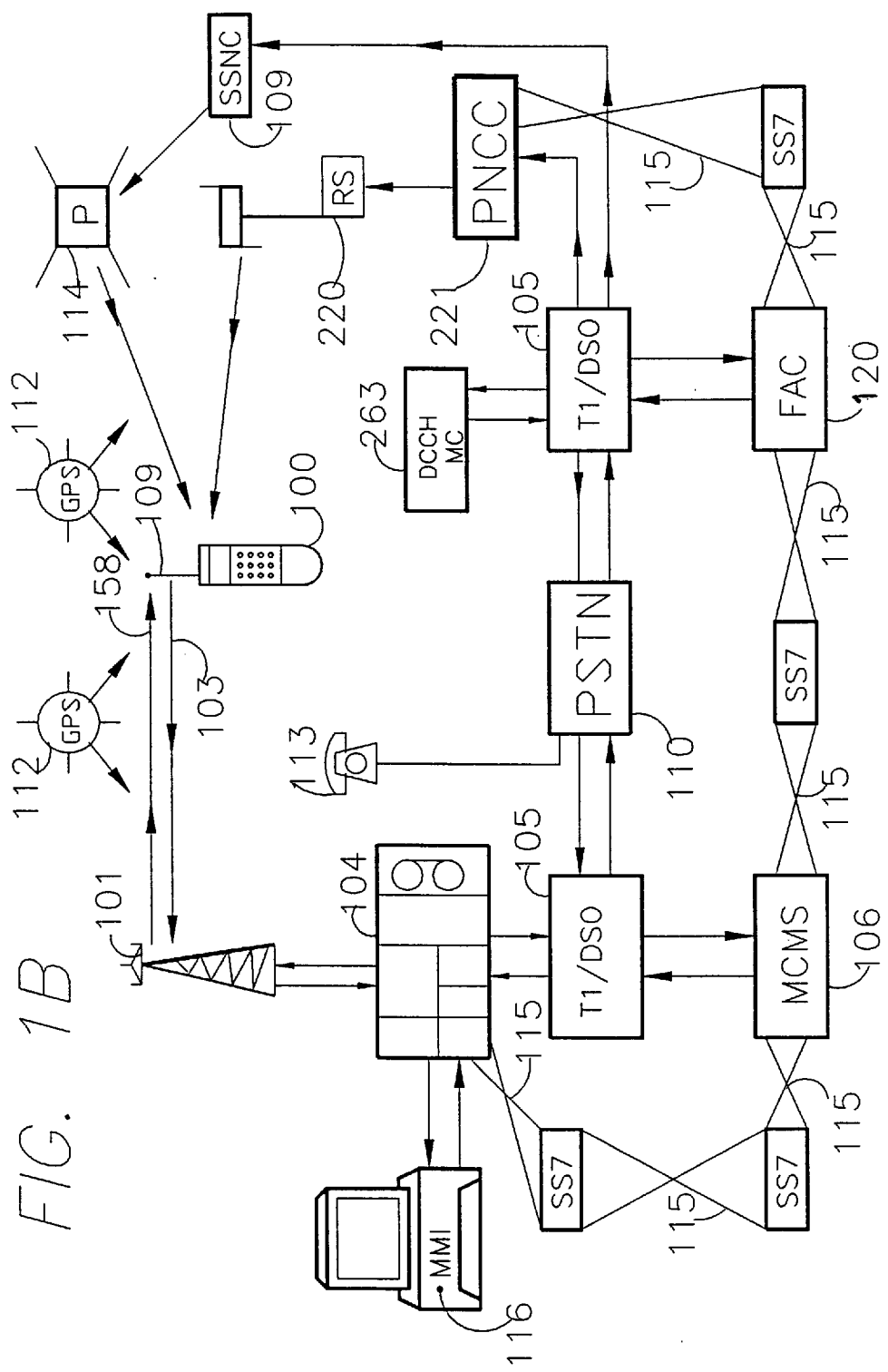
FIG. 1B is a block diagram of a preferred control channel application data (CCAD-RAAM) communications system and apparatus, according to the invention.

Referring to FIG. 1B, the CCAD-RAAM virtual network preferably comprises a CCAD mobile communications terminal 100, a plurality of base sites (BS) 101, a plurality of mobile switching centers (MSC) 104, and multiple SS7 links 115, that operably connect master central monitoring station MCMS 106 to each mobile switching center (MSC). A UNIX based man-machine interface terminal 116 is preferably located at each MSC 104, with a plurality of application specific facilitator bearer service providers (FAC) 120 communicatively linked to a plurality of global positioning Navstar satellites (GPS) 112, Inmrsat P satellites 114, and cell broadcast transmitters located at and integral to the base site. The method of the present invention preferably utilizes paging network controllers (PNCC) 221, and satellite system network controllers 109. Additionally, the CCAD-RAAM network includes interactive means including PSTN via T1/DSO interfaces 105 and caller access via a plurality of conventional landline telephone access 113. An alternative downlink path to paging is via IS-136 DCCH forward message system that is accessed via the DCCH message center (MC) 263 which can be situated at a separate facility, or co-located at a participating MSC.

The CCAD-RAAM system of the present invention can be configured with the following cellular operations standards; AMPS cellular, TACS cellular, ETACS cellular, NMT cellular, TDMA cellular, CDMA cellular, and/or a Global System for Mobile (GSM) cellular network systems. The present invention operates in essentially the same protocol and network methodology regardless of what air-interface protocols and modulation formats a particular cellular systems control channels, access channels and overhead signaling channels are configured for, be it digital or analog. Furthermore, the base sites (BS), mobile switching centers (MSC), the PSTN, and SS7 links are, preferably, part of an existing cellular communications system which operates over a designated cellular communications band. Thus, details of their construction and operation are known to those of ordinary skill in the art and descriptions thereof will be omitted.

Referring now to FIG. 1B, the MCMS 106 and FAC 120 are both CCAD-RAAM virtual network system elements. Each element or facility is preferably comprised of one or more computer terminals for processing data word packets, sending specific device status messages to each facilitator 120, sending communicator device maintenance and system upgrade messages, and specific commands and automatic instructions to end users. Furthermore these facilities are designed to send alpha and numeric messages to users for normal information transfer, and for constantly updating current user serving system location parameter. MCMS 106 and FAC 120 also contain standard telephone lines, GPS, Loran C, dead reckoning and other topography tracking software, and readout displays, multiplexing switches, frame relays, SS7 links, PSTN X.25 lines, T1/E1 lines, and other standard central monitoring and service center equipment, widely known in the art, and descriptions thereof will also be omitted. As will be explained in more detail below the MSC, MCMS and FAC process and receive CCAD-RAAM data word packets and configure all command messages, alpha-numeric messages, maintenance instructions and automatic instruction data words to be transmitted to the end-user and are governed by operating software programs contained within the processors and terminals located at the CCAD-RAAM installations.

Each CCAD-RAAM multi-word FSK RECC analog packet 103, that is transmitted from an CCAD communicator 100, contains location GPS bits, and other pertinent application specific status bits. This particular packet is designed to operate within the parameters of the American Mobile Phone Standard (AMPS) and Total Access Communications System (TACS) cellular system control channel and network protocol processing routines. Additionally, FIG. 2, illustrates how the CCAD data packet is created, transmitted, recognized, analyzed at the MSC, and transferred via SS7 links to the MCMS.

Figure 2:
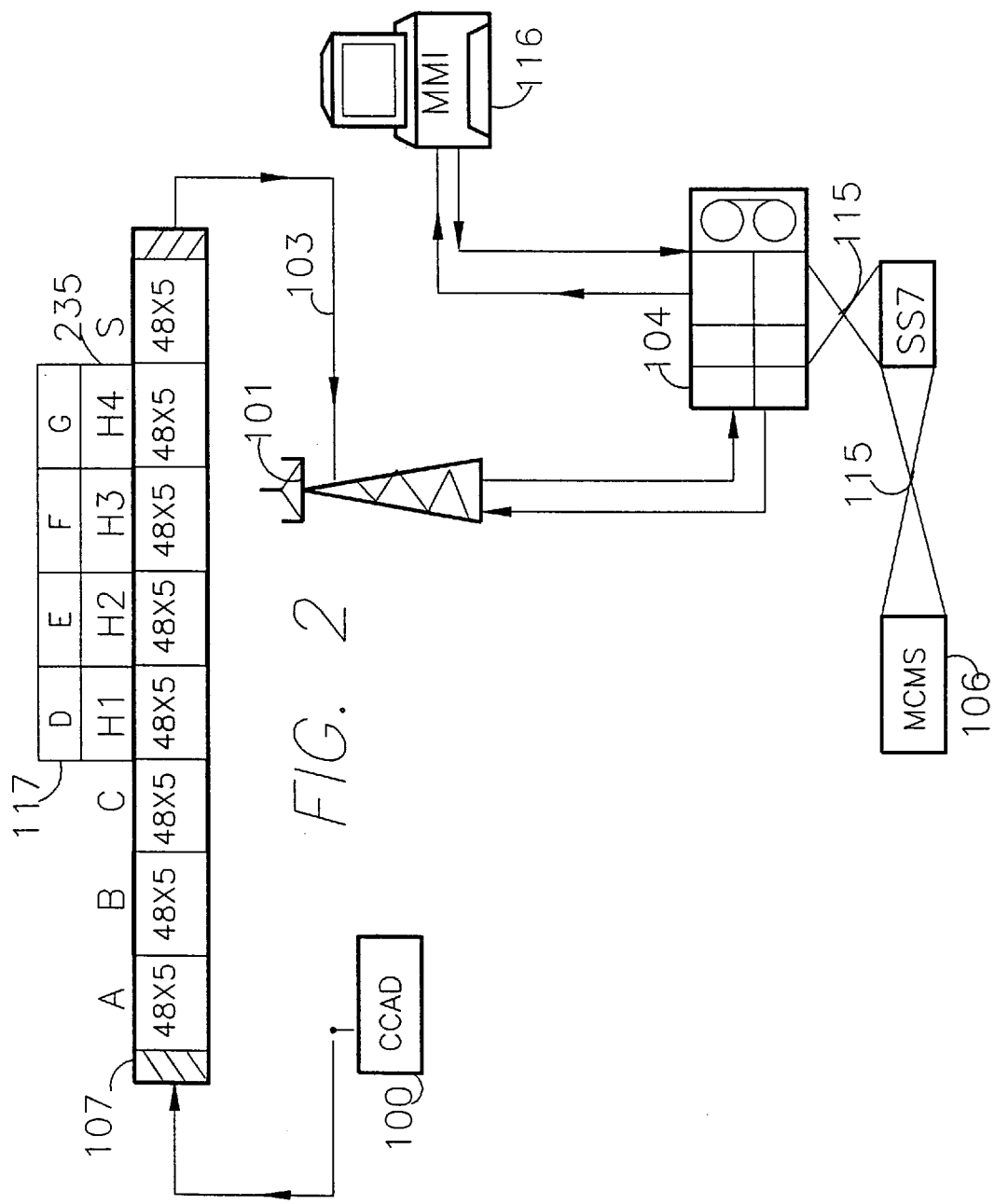
FIG. 2 is a logic flow diagram of CCAD-RAAM application data message and processing system according to the invention.
Figure 9:
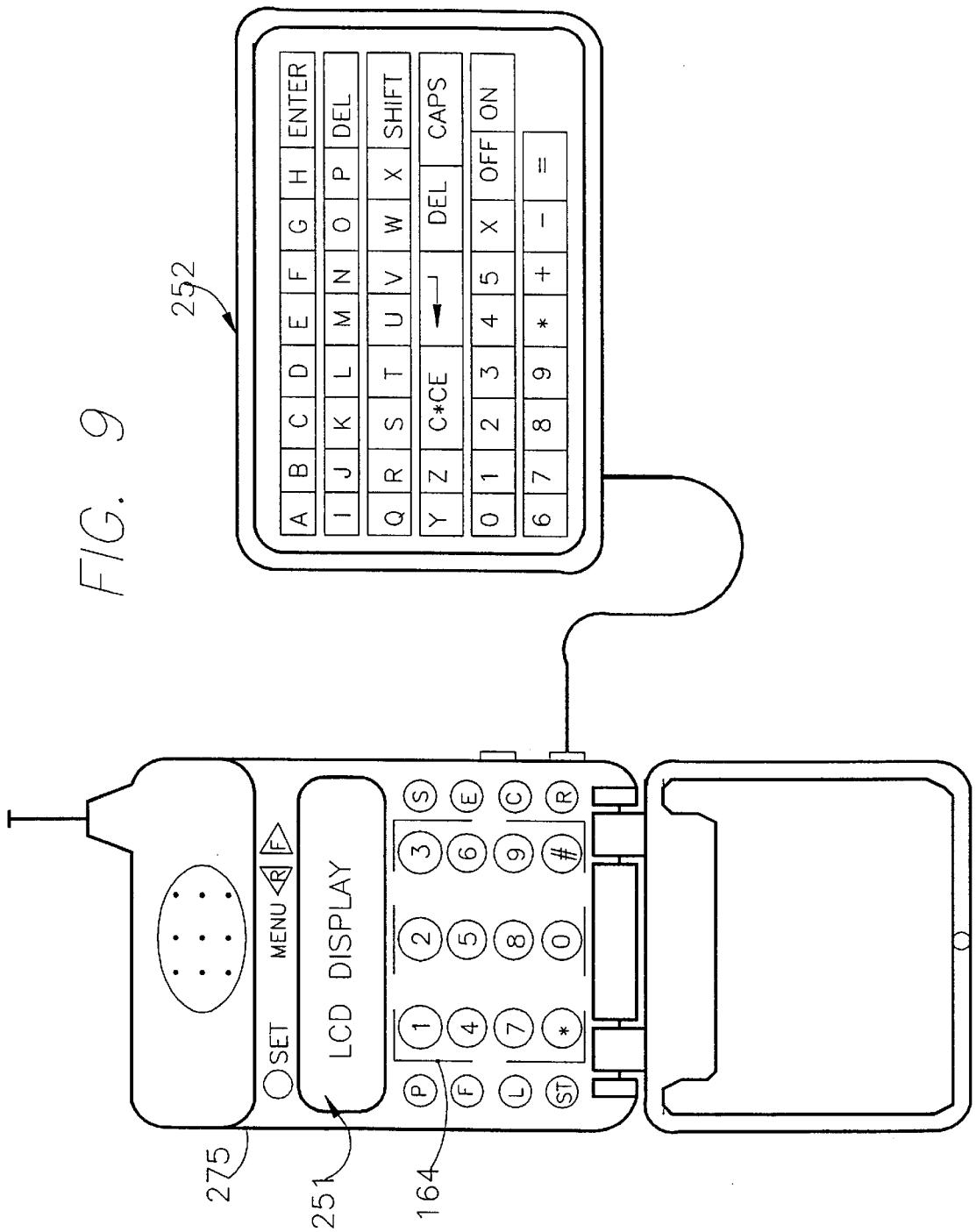
FIG. 9 is an illustration of the CCAD-RAAM communicator with optional PDA terminal, according to the invention.

With specific reference to FIG. 2, a CCAD data packet 103 is shown utilizing a 48 bit word designated herein as the H word; H1 through H4 235. Each word is made up of 36 information bits and 12 parity bits, and is specifically designed to contain and carry application specific data bits such as GPS correlation location position bits and other mentioned CCAD status bit information. The particular AMPS and TACS RECC protocol shown allows for up to eight words to be sent in one RECC multi-word data packet or data burst. However, most American cellular switch configurations are allowed to accept five RECC 48 bit words, and some will allow for seven words to be received and processed. The preferred creation, transmission, and management methodology is as follows. Most CCAD applications require no more that two H words to be transmitted along with the other three CCAD communicator identification and service information words. However, certain CCAD applications will require only one H word to be used, and others will require up to four or five H words. Referring now to FIG. 9. the CCAD communicator 100 is preferably connected to a small personal digital assistant (PDA) keypad 252. The connection is physically made by a special port 253 located on the side of the communicator. The keypad is used for sending two way paging responses and other messages that require more characters to be transmitted. In FIG. 2 and FIG. 9, the CCAD-RAAM H-word packet 107 can be transmitted a second time that enables a two burst transaction, and allows for the communicator 100 user to send up to 72 characters to the person who initially paged him or her. Using the PDA keypad 252, the user can send personalized messages to whoever pages him, and does not have to be limited to "canned" or embedded responses. However, the communicator 100 user can transmit canned responses that are embedded in the communicator software, and accessed by the user via a menu display, if response time is a factor. Another important feature is that instead of utilizing traffic channels and specialized modems, these messages are sent via control channels with CCAD communicators without the need of specialized modems, creating a direct protocol-to-protocol data link. This keeps end user equipment cost extremely low, in fact no more than a normal cellular phone, and maintains a simple and efficient communications methodology. The present methodology and apparatus creates a personal communications system (PCS) handset with all the features of the much touted "PCS Revolution." Additionally, some digital access and control protocols allow for up 184 CCAD-RAAM data bits, and an unlimited application specific data packets to be attached to registration packets, origination number packets, and other signaling packets. In still other cellular radio digital systems, application data packets can be sent independent of all other access protocol routines, are as stand-alone CCAD-RAAM packets, as long as a designated cellular control channel and access channel operations standards allows for separate and independent application specific data word packets to be transmitted, received, recognized and processed. But, for purposes of explanation, the FSK RECC 48 bit multi-word packet will be the focus of this disclosure.

Figure 3:
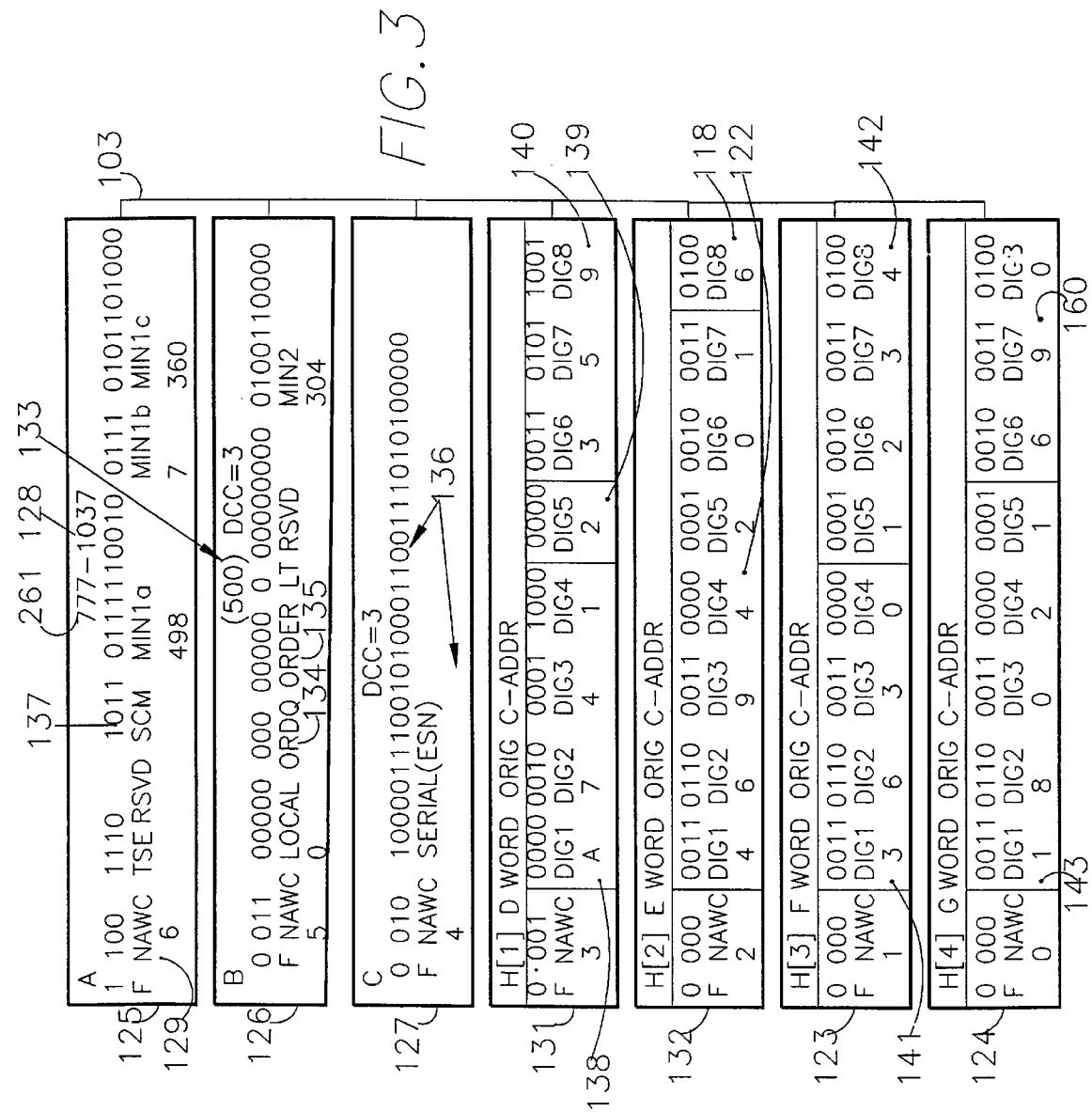
FIG. 3 shows a CCAD-RAAM analog FSK 10 KBPS RECC channel word block diagram, according to the invention.

In FIG. 3, a block diagram of a FSK RECC 48 bit CCAD-RAAM data packet with four H words attached is shown and depicts the three A, B, and C preamble words of this basic CCAD-RAAM packet, illustrating an example of the significance of each information bit. This FSK RECC 48 bit data packet is in fact a separate and distinct CCAD-RAAM air interface and short message enabling protocol that is a significantly modified, yet transparently compatible AMPS, D-AMPS and TACS control channel and switch feature activation protocol. This CCAD-RAAM protocol operates, and is initially treated and recognized by the mobile switching center (MSC) as an origination protocol, but once received at the switch, and the first four digits 138 of H[1] word 131 are analyzed; *741, the MSC does not "grab" a voice channel, that normally occurs during an origination procedure.

Origination procedures are typically used to initialize and activate voice calls, but the present methodology only uses the origination order qualifier code 134 and order code 135 contained in the B word 126 to cause the base site and switch to allow the CCAD-RAAM packet to pass and be processed transparently, without the need of changing base site and switch software routines. Specially designed CCAD-RAAM codes are placed in the first four digit spaces of the H[1] word cause the mobile switching center (MSC) to recognize this distinct protocol as a conventional remote feature control request that is yet another feature of the origination procedures. Remote feature control requests are typically used to allow the user to see if there are messages waiting for him at his home cellular system. This remote feature control request can also cause his landline telephone calls at home or office to be routed to his mobile phone automatically. However, never as this feature been used in reverse, and as detailed and described herein, that is to send messages from a CCAD-RAAM communicator to a remote facility such as a master central monitoring facility (MCMS) that is a service control point (SCP) on an SS7 network. Combined with conventional one way paging, this new CCAD-RAAM system, that is derived from conventional technology, creates a new paradigm, that provides a wide range of services for the wireless industry. Therefore this depicted packet is in fact a control channel application data (CCAD) remote access application message (RAAM) protocol specifically designated to be utilized by remote access application messaging (RAAM) systems and application specific bearer services for the purpose of enabling an wide variety of CCAD-RAAM short messaging application specific services.

As further shown in FIGS. 1B, and 2, the CCAD-RAAM communications terminal 100 is preferably configured to operate within the parameters of AMPS, NAMPS, DAMPS, TACS and ETACS cellular standards. The CCAD-RAAM communications terminal 100 transmits a CCAD-RAAM data packet 103. The MSC 104 switch software is normally programmed to receive and recognize CCAD-RAAM data packets and automatically route the packets to the MCMS 106 via multiple-redundant SS7 links 115. In fact, the entire CCAD-RAAM data messaging system can be implemented and integrated with any cellular network and its operations standard with software patch modifications to any MSCs without any need of adding separate infrastructure hardware, as is the case with other data systems such as cellular digital packet data (CDPD). Therefore the present invention provides an invisible CCAD-RAAM network overlay system, that in fact creates a separate and distinct CCAD-RAAM virtual network that operates in tandem but transparently to the host cellular network.

In FIG. 1B, the CCAD-RAAM communicator 100 preferably transmits an application specific data packet 103 which is received by the base antenna 101, passes through the base site (BS) 102, is received by the mobile switching center (MSC) 104, the packet is analyzed, and is sent to the MCMS 106 via redundant SS7 links 115. Once received, the MCMS interrogates its own home location register, retrieves the data information contained in all received H words, derives application specific status from this received digits, stores and processes the results, and if applicable, sends the status data to the facilitator/bearer 120 via redundant SS7 links, and/or T1/DSO 105, or direct in dial (DID) pathways provided in the public switched telephone network (PSTN) 110. Once received at the facilitator/bearer facility 120 the data is analyzed, and if a response is warranted, the facilitator sends a message and message request to the MCMS 106 via the PSTN or SS7 network. Once received the MCMS 106, interrogates its own home location register (HLR), retrieves the user's most recent serving cellular system location, looks up the paging company that serves that particular geographic service area (GSA), coordinates and establishes its routing tables, and sends the message to the paging network control center (PNCC) 221 via redundant SS7 links, or via PSTN and T1/DSO network circuits. The paging network controller transmits the message to the user via one or more transmission towers 220. The message sent can contain a wide variety of information as previously discussed. For example, the message can be a simple phone number that tells the user to call a person that paged him. Or if the CCAD-RAAM communicator 100 is equipped with a GPS receiver, the message can be an automatic command that causes the communicator to perform and automatic location update by correlating GPS Navstar satellite 112 C code timing bits, for example, and derive an accurate relative location. Once the relative location update is performed, the new location is systematically derived and compiled for H word transmission. This procedure demonstrates a totally separate but transparent procedure, thus creating a CCAD-RAAM virtual application specific network. This CCAD-RAAM technique allows for applications such as two way paging, fleet management, motor vehicle anti-theft and recovery, home arrest, personnel management, remote stationary sensor management and many other application specific purposes.

Referring now to FIGS. 1B and 3, a man-machine interface 116, that is typically located at each mobile switching center (MSC) 104, is used to update call treatment routing tables and call performance parameters. In compliance with IS-41 call treatment procedures, various remote access feature codes can be created without modifying switch and base site software. For example code *741 activates a procedure that causes all dialed digits to be sent to a remote home location register (HLR). The switch examines and analyzes the mobile identification number (MIN), that is assigned to the CCAD-RAAM communicator 100, and contained in the A word 125 and B word 126. The MIN office code 261, XXXX code 128 and number plan area (NPA) area code 113, cause the switch to assign the CCAD-RAAM packet to an SS7 link, that will ultimately cause the packet to arrive at the MCMS. Once the packet arrives, the MCMS processes that packet, and sends a confirmation indicator packet to the current serving MSC that originally sent the CCAD-RAAM packet. Once the conformation packet or routing instruction code (RIC) is received the serving MSC can send a completion parameter on the overheard forward control channel FOCC to the CCAD-RAAM communicator, and if the CCAD-RAAM communicator has voice capability such as a two way paging communicator, a conformation tone is sent to the user to tell him the CCAD-RAAM message has been received. In still another scenario, the serving MSC can cause a recording to be sent to the user that says "your message and been received." Or no recording or beep tone need to be sent. This is especially valuable for CCAD-RAAM applications that utilize no voice capabilities. Such methodologies may all be configured at the switch by simply entering selected parameters in conjunction with existing remote activation codes used in cellular industry, or special CCAD-RAAM codes can be created and entered at the man-machine interface (MMI) 116, while still adhering to current conventional IS-41 operations parameters. Thus the present invention takes existing data, and manipulates this data to create a new application specific data, without having to add new hardware or software at the base site and mobile switching center.

Referring to FIG. 1B, in still another example, the mobile switching center (MSC) is configured with the digital TDMA IS-136 digital control channel (DCCH) one way messaging service that provides notices, message waiting indicators and other alpha text services to a user on the forward digital traffic channel. By combining this one way service with CCAD-RAAM another important and transparent two way messaging system is created. For example, the DCCH message center (MC) 263 is connected to the PSTN 110 via T1/DSO 105 or other signaling protocol. In a typical scenario, a landline caller 113 places a page or message to the cellular user via the DCCH MC 263, and the message will be transmitted on the forward digital traffic channel. But the only choice the user has to send a response message is by placing an expensive voice call. If, for example, the user is in a business meeting and cannot make a voice call, using the CCAD-RAAM he simply takes his communicator and sends a response to the caller. Still the DCCH feature, combined with CCAD-RAAM can be used to implement a truly enormous amount of application specific services heretofore mentioned. CCAD-RAAM combined with DCCH can create another communication paradigm without using one way broadcast paging. The MCMS 106 can send messages, instructions, commands and other data to the serving MSCs DCCH MC 263 via the PSTN 105. Current user information is utilized with DCCH in the same means and method that has been described in the paging system scenario, that is, user location is derived in terms of current serving cellular system from the switch when it sends the CCAD-RAAM packet to the MCMS 106 via the SS7 network. Under current IS-41/SS7 guidelines, the serving MSC or switch sends carrier identification codes (CIC) with every outbound message that is sent on an SS7 link. Therefore, when the CCAD-RAAM MCMS receives the CCAD-RAAM packet, the MCMS analysizes the CIC code contained in the received CCAD-RAAM packet, and identifies the sender as a particular serving cellular system located in particular network, such as the North American Cellular Network (NACN) or the Mobilelink Network located anywhere in the U.S. or any network tied into any host SS7 network in the world. There is also specific serving cellular switch identification bits contained within the received CCAD-RAAM data packet. Therefore the MCMS can send a response message to the user via DCCH or the paging network by simply comparing the received identification and routing information to known paging and/or DCCH message center location information and sending the command message alpha or numeric to a particular CCAD-RAAM communicator user. In still another scenario, the CCAD-RAAM communicator 100 can be configured to receive Inmarsat P signaling from an Inmarsat satellite 114 that is controlled by a satellite system network hub or controller (SSNC) 109. Any satellite can be used such as FM sideband satellites used by paging companies to transmit nationwide synchronized pages. The MCMS 106 can transmit a message and message request to a serving satellite network controller and the controller simply relays the message to the appropriate satellite and the CCAD-RAAM user receives the message, or command in the same manner as heretofore described. The possibilities are numerous, as the present methodology utilizes existing communications technology to create a new short messaging communications paradigm. In fact, one of the major problems in one way paging networks that is solved with CCAD-RAAM is that, under conventional paging procedure, in order for a pager user to receive a message an entire network systems resources has to be used to transmit a synchronized page. The reason for this is that the paging company has no way to know where the pager user is, so a blanket page of an entire service region has to be performed. With CCAD-RAAM, the MCMS know the current location of the CCAD-RAAM communicator that is equipped with a paging receiver. The MCMS simply forwards the message to the pager user in the same footprint or serving area as the current serving cellular system. In this way the paging company can offer nationwide paging, local rate charges, for the paging company does not have to tie up so much message processing and transmission capacity to perform large blanket pages.

Referring now to FIG. 3, the CCAD-RAAM data packet is configured to appear like an origination packet that contains anywhere from eight to thirty two dialed digits. However, what is important to note here is that none of the depicted digit fields are dialed by the user, as is the normal procedure in a conventional origination scheme. The digits contained in words H[1] through H[4] are automatically derived from the CCAD-RAAM communications software and application specific device derived status conditions. For example in H[1] word 131 which, "looks" like a D word or first word of the called address when analyzed by the base site and MSC, the data is interpreted as follows; Digits 1 though 4 138 represent the RAAM feature activation code. Digit 5 is the first significant information status four bit field that can represent and indicate to the MCMS, the specific application specific service that the CCAD-RAAM communications device is attributed to. Digits 6 though 8 140 can contain a two way paging canned response code, or a GPS device code such as velocity or altitude indicators. This can also indicate to the MCMS and ultimately to the specific facilitator/bearer that the CCAD-RAAM user is at a specific location, for example, on foot or inside of a vehicle. In one scenario, the CCAD-RAAM communicator 275 as depicted in FIG. 9, can be used as a handheld communications device that contains a GPS receiver, with an attached external keypad 252 for sending alpha messages. This same device can be placed in a docking stirrup mounting inside of a motor vehicle, that is configured to include and external GPS and cellular antenna interface. Once the CCAD-RAAM communicator is placed in the is stirrup, the internal software means of the CCAD-RAAM communicator can detect if the communicator is in fleet management mode or personnel management mode and change the status of the digit fields 6 through 8 contained in H[1] word 131 as depicted in FIG. 3.

For FIG. 3 H[2] word 132 can contain the telephone number of a person who has as paged the CCAD-RAAM communicator user. Digits 1 through 7, 122 are a two way paging seven digit response number 122. This number is sent as in all normal pages when the caller seeks to be called by the pager user. In this way all manner of services such as paging, remote monitoring, tracking, etc. can be derived from this simple CCAD-RAAM procedure. For example, if the pager user is called by a person with a long distance number, digits 6 through 8 in H[1] word 140 can also be used to carry this area code information. Dig 8, 118 in H[2] also conventionally recognized as the E word or second word of the called address, but in no way utilized as an originating called address by the CCAD-RAAM user, contains the "canned" two way paging response code that instructs the MCMS and more specifically the two way paging facilitator/bearer that the CCAD-RAAM user wants to send this response to the paging caller. Message 6 as indicated in the H[2] word field tells the two paging facilitator/bearer to automatically call the pager user caller, and play back a previously stored voice message such as "I will call you at home tonight after five o'clock". The functionality and flexibility of this scenario is extremely broad. Such services as certified response paging can be implemented whereby business can invoke paging responses to a sales force in the field, and have automatic page responses logged into a computer data tied into a PSTN dial in direct service provided by the two way paging facilitator bearer. The CCAD-RAAM two way paging device is programmed to automatically respond to received pages without the need of CCAD-RAAM two way paging user interface. H[3] word, 123 conventional identified by the serving cellular system as the F word of the called address, but in no way used by the present invention or the CCAD-RAAM user as an originating called address, contains global positioning longitude and latitude relative positioning status information. Digits 1 through 4, 141 contain GPS relative position status fields. Digits 5 through 8, 142 may contain motor vehicle, home arrest or personnel specific status fields for example. H[4] word which is conventionally identified by the base site and mobile switching center as the G word of the originating called address, but in not used by the present invention or CCAD-RAAM user in that way. Digits 1 through 5, 143 contain GPS relative position information. Digits 6 through 8, 160 contain other application specific information such as automobile security system alarm status, meter reading, remote monitoring, and any other CCAD-RAAM application specific system status.

Figure 4:
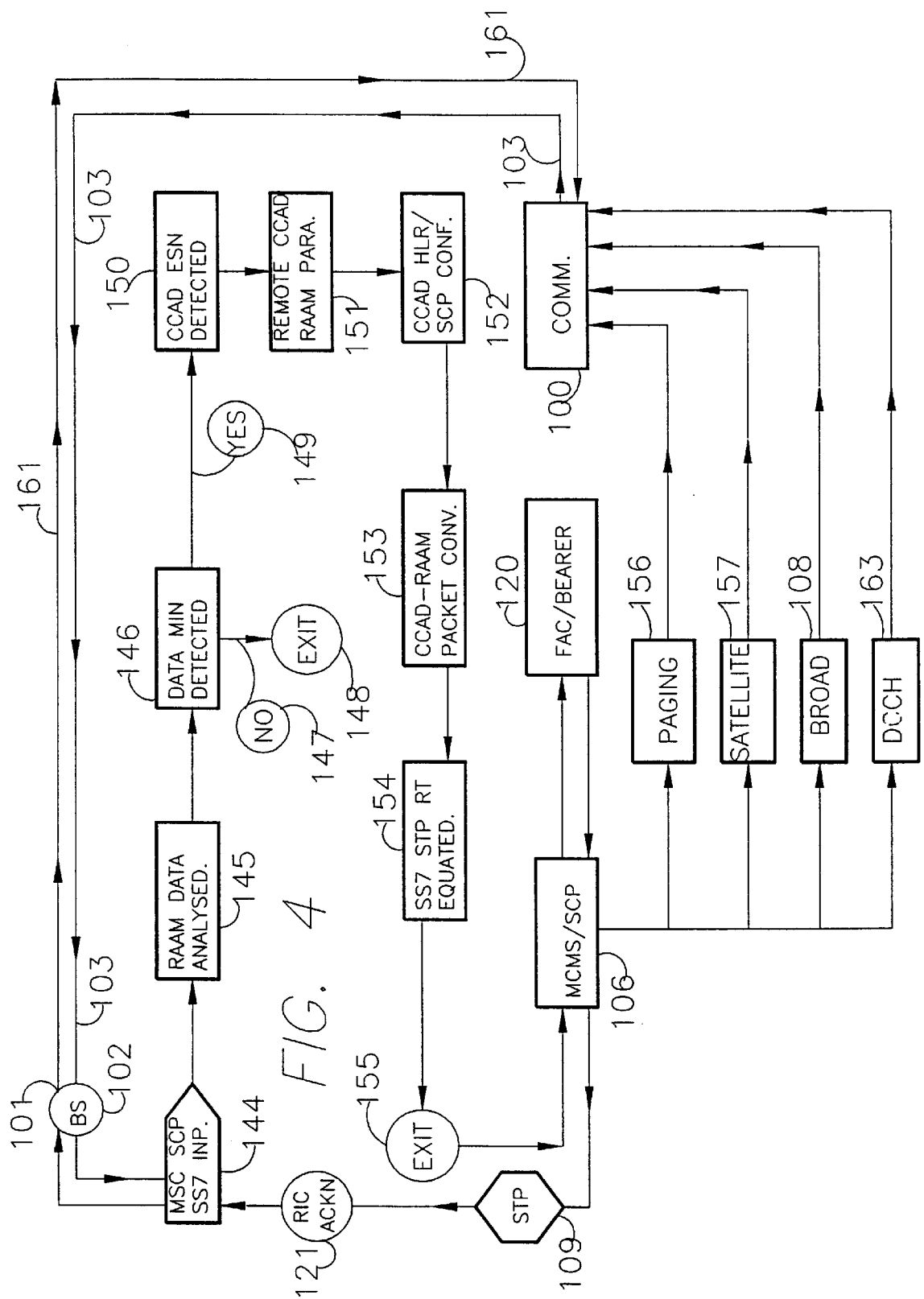
FIG. 4 shows a logic flow chart of the CCAD-RAAM data packet MSC processing routine, according to the invention.

In FIG. 4, a preferred CCAD-RAAM MSC data analysis procedure is illustrated. The CCAD-RAAM terminal or communicator 100 transmits a packet 103 that contains one to four H-words and is received by the base site antenna 101 and base site 102, relayed to the serving MSC interface 144, and the data is analyzed 145. The heretofore mentioned data only special mobile identification number (MIN) is not detected 147, therefore the data is discarded, and the procedure is exited 148. If the CCAD-RAAM data only MIN is detected, the CCAD-RAAM procedure continues, 149. The CCAD-RAAM electronic serial number is detected and is validated 150. The remote access application messaging (RAAM) parameter is executed 151. The CCAD-RAAM MCMS service control point (SCP) home location register (HLR) is identified by the MSC 152, and data conversion is initiated. Conversion is completed, thus codifying CCAD-RAAM MIN as SS7 IS-41 identification and routing data bits 153. The MSC service control point sets up initial SS7 signaling transfer point, global, cluster and signaling system network node identification and routing codes 154 and the message is sent on an assigned SS7 link and exits the MCS/SCP 155. The CCAD-RAAM data packet arrives at the master central monitoring stations service control point (MCMS/SCP) 106. The CCAD-RAAM data is analyzed, and a routing instruction or acknowledgment signal 121 is sent to the current serving MSC via the nearest SS7 signal transfer point (STP) 109. The serving MSC receives the acknowledgment at the SS7 interface 144 either is instructed to send a voice acknowledgment to the CCAD-RAAM user 161, or a tone acknowledgment, or simply indicating to the CCAD-RAAM communicator 100 that the transaction is complete by sending a conventional overhead response on the FOCC channel to the CCAD-RAAM communicator 100, as is normally performed in this case of any action initiated by a mobile telephone during an order qualifier 000 or order code 0000, routine such as autonomous registration, origination or order response routine, that requires an instruction code to be present in the B-word of the RECC 48 bit CCAD-RAAM message. There are four principal ways that a CCAD-RAAM communicator 100 can receive automatic commands, alpha-numeric messages, and encoded messages. They are normal paging 156, satellite signals 157, point to omni point or point to point cell broadcast signals 108, that are specified for future personal communication system (PCS) platforms, and DCCH digital signals 163, so specified in documents such as IS-136.

Figure 5:
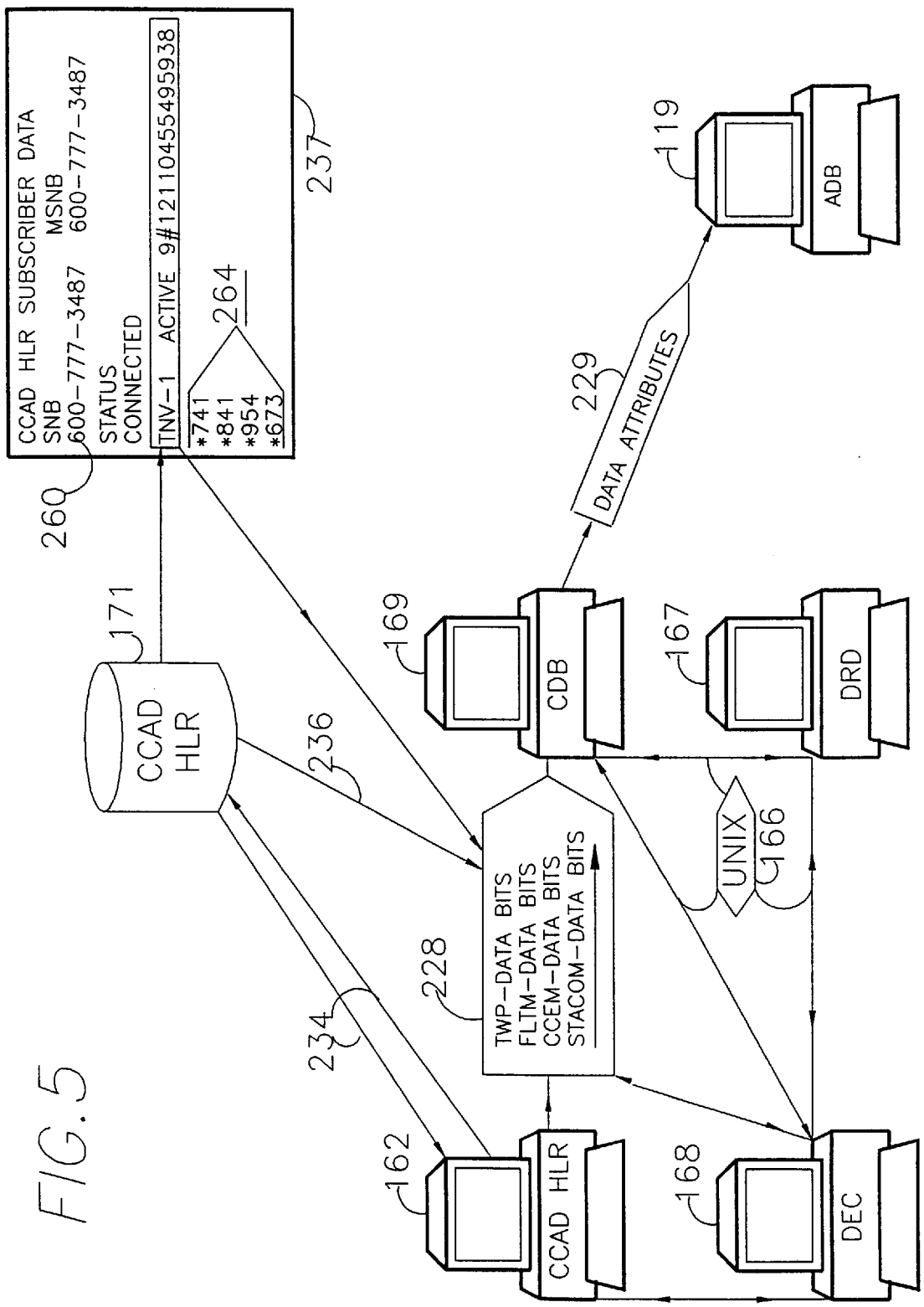
FIG. 5 shows a block diagram of CCAD-RAAM protocols and processing means used by the invention, according to the invention.

Referring to FIG. 5. a master central monitoring station (MCMS) data processing and management elements and terminals are shown. Once the CCAD-RAAM data packet is received at the CCAD-RAAM home location register (HLR) 171, it uniquely collects subscriber data 237 that contains CCAD-RAAM MIN numbers 260, and RAAM activation messaging codes 264. Each of these codes is a special activation code that instructs the MSC to send the active data to the CCAD-RAAM MCMS. Once the data is sent, the CCAD-RAAM HLR 171 receives the data, and the CCAD HLR V.325 data service unit readout and application specific data capture terminal 162, captures, analyzes and stores the data. Normally, any received data is not construed as application specific messaging that arrives to the HLR as a result of a two way paging message, a fleet management message, a continuous electronic monitoring message used for home arrest, or a stationary communicator message that contains system status information such as electrical meter reading or security system reading 228 for example. The CCAD-RAAM HLR data service unit 162, in a continuous duplex communication data exchange 234 instructs the CCAD-RAAM HLR 171 to send back an appropriate MSC response code that tells the MSC to complete the CCAD-RAAM message transaction as a completion with either as tone recording, a pre-recorded message, or simply an overhead completion message as heretofore described. Once the CCAD-RAAM data service unit terminal 162 receives the data it relays it the CCAD-RAAM comparative data base (CDB) terminal 169 via the CCAD-RAAM decoder (DEC) terminal that decodes the received encoded data, and the data reception and distribution (DRD) terminal 167. All CCAD-RAAM MCMS data processing terminals preferably process and communicate with one another in UNIX 166, a very versatile and efficient computer and data base language. Once the CCAD-RAAM data is decoded, it sent to the CCAD-RAAM data reception and distribution (DRD) 167 terminal, that either stores the received information, or in conjunction with the comparative data base (CDB) 169 relays the data to the facilitator/bearer. Once the facilitator bearer responds with a message and message request, the DRD terminal 167 sends the request to the CDB terminal 169, the CDB looks examines the files the various data attributes are appended to 229 such as message routing instructions and destination codes, and the message is transferred to the action data base (ADB) 119 that determines which network services, derived from the data attributes, be it paging, cell broadcast, satellite or DCCH, the message will be sent to.

Figure 6:
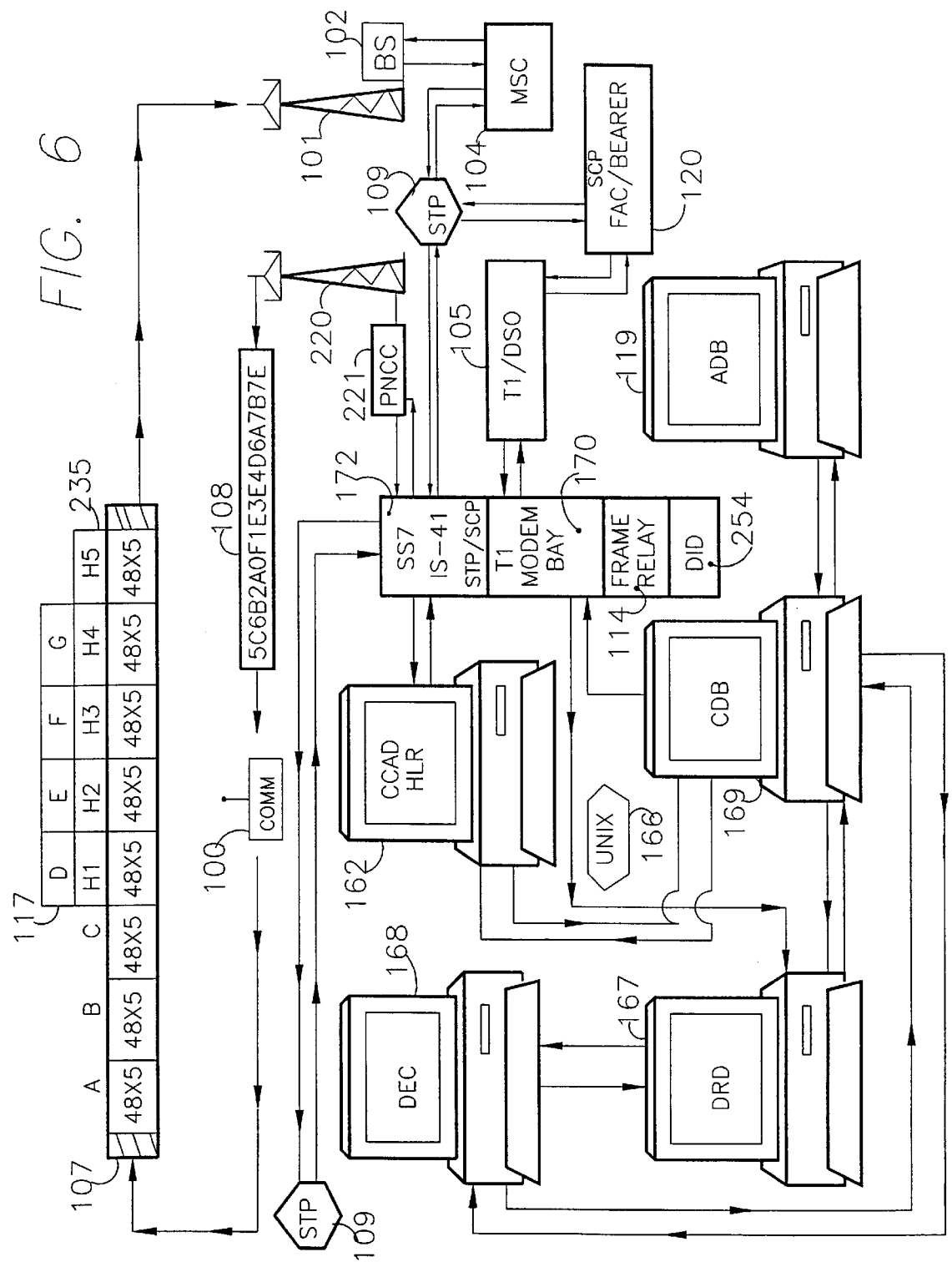
FIG. 6 shows a master central monitoring terminal and component configuration, according to the invention.

Referring to FIG. 6, a detailed illustration of various CCAD-RAAM MCMS data management, processing and CCAD-RAAM network element communications is shown. The CCAD-RAAM data packet 107, that is transmitted by the CCAD-RAAM communicator 100, and recognized and treated by the serving MSC as an origination packet with normal called address D through G 117, is actually an application specific data packet that contains automatically, software derived H-words 235, that are not created by any dialed digit entry from a mobile telephone keypad. The CCAD-RAAM data packet is created by the software means contained with the communicator 100. The data may be derived from, for example, (1) received messages sent from the MCMS via heretofore mentioned network and air-interface protocols, (2) application specific device status changes detected by the CCAD-RAAM communicator software, such as low battery power and other internal communicator maintenance status, (3) simple entered instructions from the user, such as scrolling a menu button on the CCAD-RAAM communicator, choosing the selection, for two way paging and fleet management and simply pressing send, (4) systems that are separate but physically connected to the CCAD-RAAM communicator such as motor vehicle anti-theft alarms, external antennas, and other such remote sensing devices, and (5) internal sub-systems contained within the CCAD-RAAM communicator such as separate but physically integrated in the CCAD-RAAM communicator enclosure such as radio receivers designed to detect the presence or lack of presence of home arrest leg band and wrist band radio propagation signals, meter monitors, gaming devices and the like. None of this data is derived from the CCAD-RAAM user directly dialing each digit that resides in the digit spaces contained in the H24 words. The CCAD-RAAM data packet 107 is created and compiled automatically, with or without direct CCAD-RAAM user interface. Once the CCAD-RAAM packet 107 is transmitted to the base site antenna 101, and relayed by the base site 102 to the serving MSC, the unique CCAD-RAAM method provides a new operating paradigm. The CCAD-RAAM data packet 107 is received via the heretofore mentioned SS7 IS-41 network elements 172, and processed in the heretofore mentioned manner, by the aforementioned CCAD processing terminals, CCAD-HLR data base V.35 DSU readout and capture terminal 162, the CCAD-RAAM decoder terminal 168, the data reception and distribution terminal 167, the comparative data base terminal 169, and action data base terminal 119, preferably in common UNIX data management and processing language 166. The facilitator/bearer can be a member service, message waiting indicators, broadcast information services, electronic mail, and the like. However, these proposed services utilize expensive and inefficient voice or traffic channels. Other services proposed include motor vehicle fleet management, motor vehicle anti-theft, and topographical coordinance systems that provide location data to bearer service processing centers, also referred to as central monitoring stations. Currently these services are offered by way of sending data packets over service control point (SCP) 120 on an SS7 network, with its SS7 network addresses stored in the host systems signaling transfer points (STP) 109, or it may be communicated with via T1/DSO signaling protocols 105, via the PSTN. Also, the facilitator/bearer 120 can be communicated with via the internet utilizing a data packet frame relay system 114, or a direct in dial (DID) system 254 located at the MCMS. In fact, the paging network system can be communicated with via the aforementioned methodology. The paging network controller (PNCC) 221 may also be accessed via X.25 protocol as well. X.25 is yet another PSTN circuit switched or packet switched signaling protocol.

Figure 7:
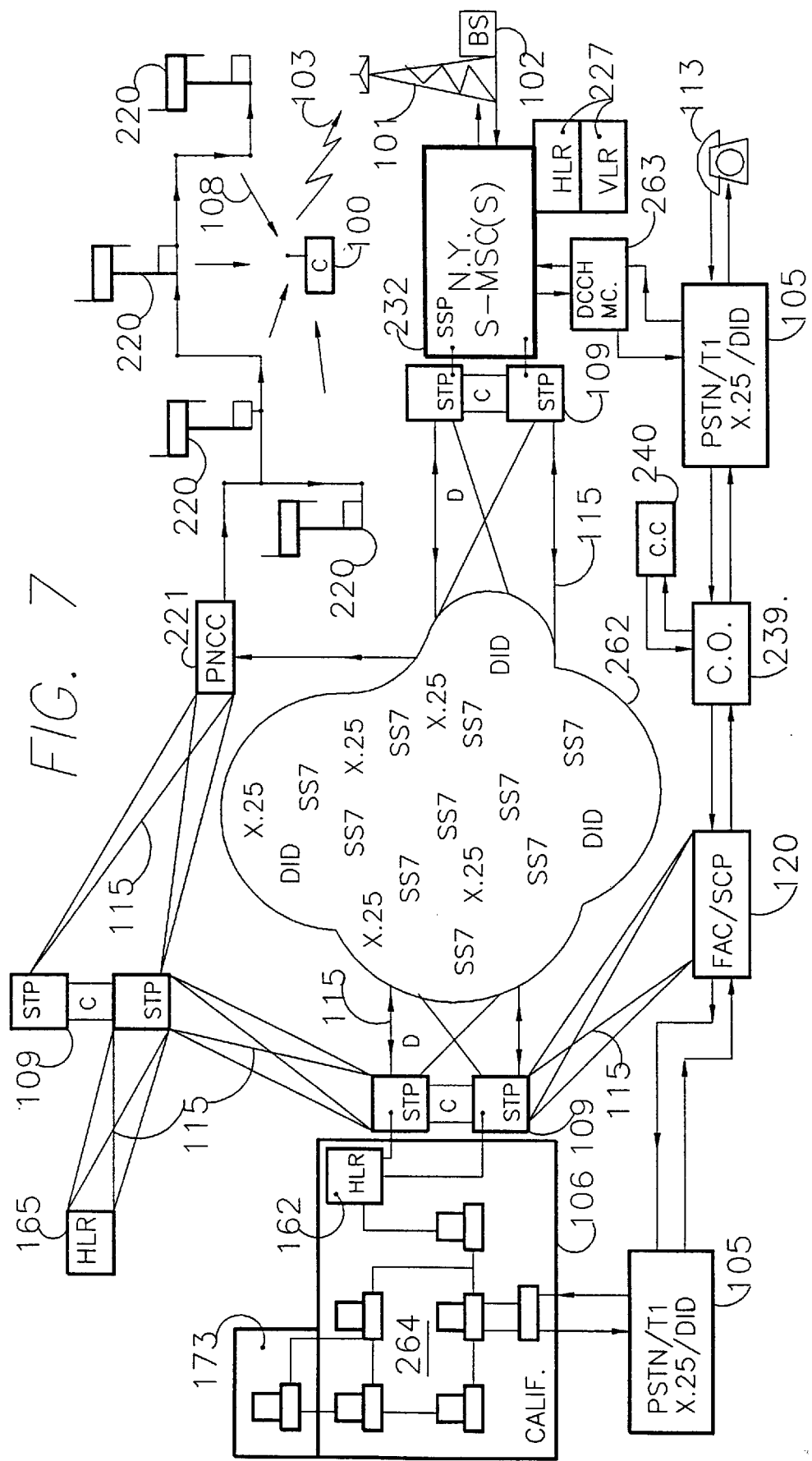
FIG. 7 shows the CCAD-RAAM cellular and paging virtual network, according to the invention.

Referring to FIG. 7 , a CCAD-RAAM virtual network overlay is shown. The CCAD-RAAM MCMS 106 can be located anywhere in the world. For example, in one scenario the MCMS 106 is located in California and the current CCAD-RAAM user is located in a serving cellular system operating in New York City. The New York MSC 232 is connected to multiple cellular antennas 101 and base sites 102 that receive the CCAD-RAAM data packet 103 transmitted by the user's communicator 100. In this scenario, the paging system, represented by numerous transmission towers 220 that are controlled by nearby network controller 221 and connected to the SS7 network by various redundant SS7 links 115. The CCAD-RAAM signaling network is part of the national and international wireline signaling network cloud 262 that "contains" numerous SS7 network, T1 network, X.25 network and other PSTN network nodes, that are interconnected by various physical links and various logical network recognition and routing codes contained within PSTN standards that include but are not limited to SS7 IS-41 compatible signaling transfer points (STP) 109. The CCAD-RAAM virtual network may be fully deployed on a national and/or an international scale. One requirement for SS7 and IS-41, is that every SS7 network element, be it an STP 109 an HLR 171 or other elements, must be fully redundant in that each element must be duplicated. The CCAD-RAAM HLR 171 located at the MCMS must also have a duplicate located at some other location; HLR 165. This location can be another city, as long as the duplicate is not affected by some power problem or other technical issue that can effect the co-located HLR at the MCMS. This redundancy requirement also creates the need to have redundant STPs 109 wherever an STP site is so designated.

Figure 11:
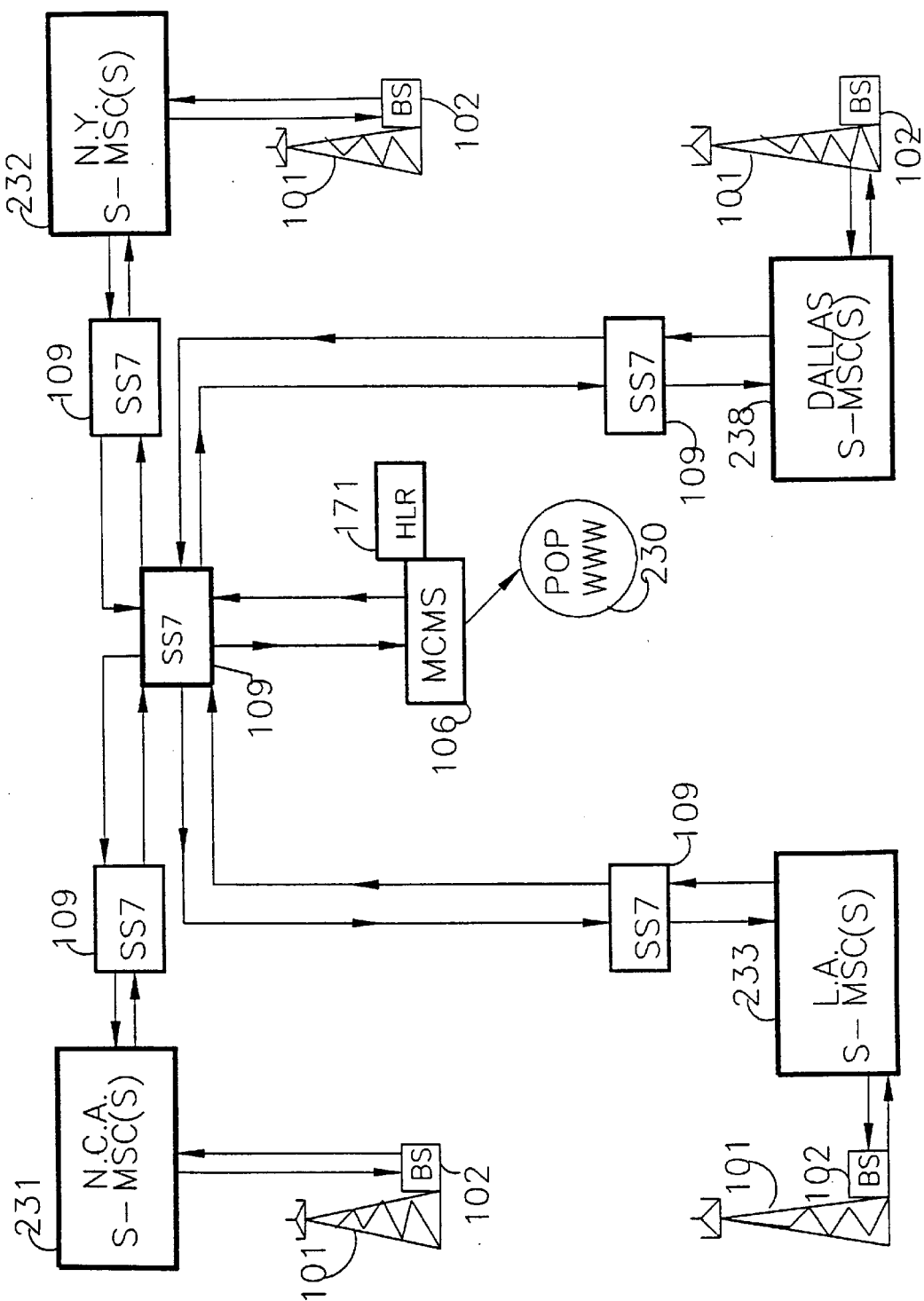
FIG. 11 is a diagram of a CCAD-RAAM multiple MSC network according to the invention.

In FIG. 11, it is seen that the MCMS 106 can be connected on the SS7 network to any MSC utilizing IS-41 mobile application part (MAP) protocol parameters. Each MSC, be it the New York serving MSC 232, a Northern California located MSC 231, a Southern California MSC 233 and a Dallas MSC 238 all are elements on an SS7 network. Each has its own multiple base site antenna locations 101 and base site locations 102. Each MSC is physically connected to a nearby STP 109. The MCMS 106 also can communicate with the World Wide Web (WWW) 230 via the internet, since it preferably utilizes a frame relay system. Therefore the MCMS may be a point-of-presence on the internet. In this way, the CCAD-RAAM virtual network can access e-mail, file transfer point (FTP) data bases and other network entities. The CCAD-RAAM user can therefore send and receive e-mail in real time.

Figure 8:
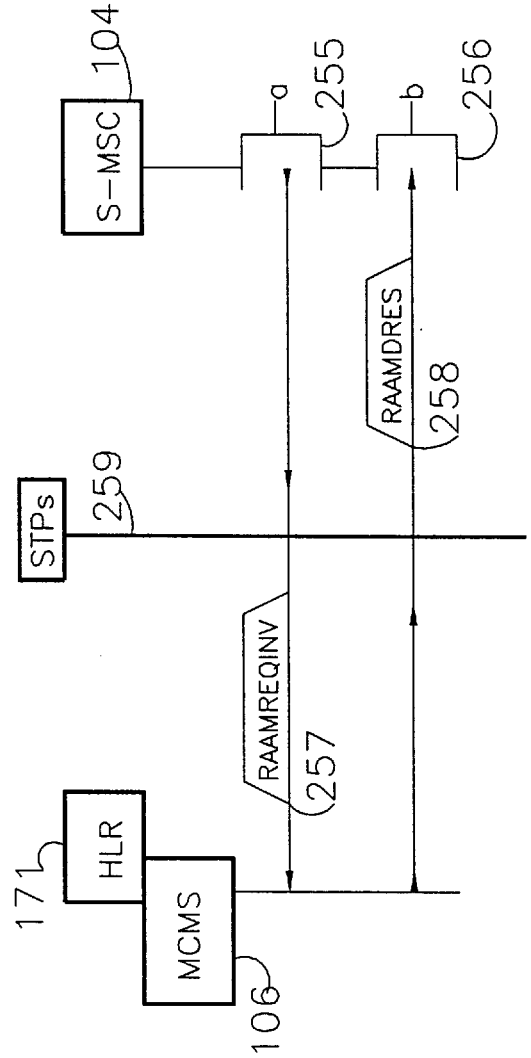
FIG. 8 shows an illustration of the CCAD-RAAM SS7 data packet processing sequence according to the invention.

Referring to FIG. 8, this diagram illustrates a representative example of messaging that takes place between a serving MSC 104 and the CCAD-RAAM MCMS 106. The SS7 network elements act as destination points for the CCAD-RAAM SS7 IS-41 mobile application part (MAP) messaging. The remote access application message request invoke 255, as part of data message that is sent from the MSC 104 and begins the transactions between the serving MSC 104 and the MCMS 106. The CCAD-RAAM message passes through a plurality of STPs 109 as a RAAMREQ CAAD SS7 257. Once received by the MCMS 106 and its HLR 171, the response, remote access application message data response RAAMDRES 258 is construed as part b 256 and completes the SS7 IS-41 transaction. Another important feature of the CCAD-RAAM messaging system is the each transaction may be a measured and billable event that is applied to the CCAD-RAAM users monthly bill.

Referring now to FIG. 10, this illustration depicts separate examples of specific RAAM activation codes that may cause the CCAD application data to be automatically treated as an outbound application specific message. Each code can activate the RAAM feature specific to different switch platforms that are manufactured by the Ericson, AT&T, Motorola and other switching platform manufacturers operating in the world today. All cellular switches operate essentially the same way, for their operating specifications have to adhere to various Interim operations standards set forth by the Federal Communication Commission (FCC), the Telephone Industry Association (TIA), Electronic Industry Association (EIA) and others. Each RAAM code specifically causes its host switch to allow the maximum amount of data words and characters to be routed to the CCAD MCMS. Depending upon how the host cellular system is configured; be it 16 digit dialing, 28 digit dialing, 32 digit dialing or a full 40 digit dialing, the depicted codes will allow maximum data packet routing. Digit capacity is solely controlled by how the base site radios are configured. It is the cellular base site radios that determine the amount of data to be passed to the switch via the control channels. Therefore the codes permit the maximum capacity allowed by the base site radio and its embedded operations program that dictate data capacity flowing on the control channels, therefore the RAAM codes must tell the switch to route the application specific data packet to the maximum capacity allowed.

In FIG. 3, the mobile identification numbers 261, 128 and 133 as depicted, tell the switch to route the CCAD packet to its intended destination on the SS7 network. The SS7 service control point (SCP) or switch point (SP) append global, cluster and node codes to the packet, convert it to 56 kbps frame relay protocols and then direct it towards the SS7 network and to its ultimate destination, the CCAD master central monitoring station. The H[1] word 131 carries the RAAM activation codes 138 that are four digits or characters, that are analyzed by the switch, and then cause the switch to route the entire five to seven word data packet to the MCMS.

Referring to FIG. 10, this illustration depicts the various activation codes contained in the CCAD H-word one that will activate the RAAM features for maximum data packet capacity, and routing efficiency. All five examples of the CCAD-RAAM H-words 240 are the first application specific words to follow the A, B and C words as heretofore discussed. H[1] word for AT&T switches 173, for example, contain a RAAM activation code 280 that can cause the RAAM feature to the activated, that so designates this CCAD origination data word packet as a distinct and different class of cellular data service that causes the host AT&T switch to translate the application data contained in the dialed digit fields sent from the CCAD application specific communicator, to SS7 IS-41 compatible data packets. Further, the translation and activation of the RAAM feature also causes the packet to be assigned an SS7 global, cluster and node routing code. This code is attached to the CCAD-RAAM SS7 packet to be sent to the CCAD MCMA via the SS7 network. The code contained in this H-word 280 is but one example of any code so designated by the operating cellular system and switch manufacture that can cause the CCAD-RAAM application specific message to be sent on an SS7 network, a x.25 network, or any other PSTN network to the CCAD MCMS, and later relayed from the CCAD MCMS to any of the designated application specific facilitators. Other H[1] word examples such as the H[1] word 276 that contains a RAAM code 281, that activates the RAAM feature in a Motorola switch for example; or the H[1] word 277 that contains a RAAM code 282 that activates the RAAM feature in the Nortell switch for example; or the H[1] word 278 that contains a RAAM code 283 that activates the RAAM feature in the Siemans switch for example; and the H[1] word 279 that contains the RAAM code 284 that activates the RAAM feature in the Ericson switch for example; are all possible codes that can cause the Remote Access Application Message feature to be activated, sent and processed by the CCAD master central monitoring station. These possible RAAM activation codes cause the CCAD data packet to be sent to the MCMS and treated as a two-way paging message, a fleet management message that contains global positioning information for example, or any other possible application specific message that is originally manipulated by CCAD communicator software means, transmitted during control channel origination procedures and contained within dialed digit fields, but in fact are no longer dialed digits in actuality.

In FIG. 9, a dialed digit group generally cannot be used with the described communicator software means to encode or encrypt CCAD-RAAM data. In fact, this keypad group 164 preferably cannot be utilized send any CCAD-RAAM data packet information at anytime, thereby creating a unique automatic messaging system from the communication inception point to the reception point represented by the CCAD-RAAM master central monitoring station, which may utilize any serving mobile switching center as a CCAD-RAAM messaging relay point.

The herein described means and methods of CCAD-RAAM combined with the data compression encoding and decoding method truly creates a separate but transparent two way communications system utilizing conventional and currently operating cellular, paging, and satellite systems.

Additional objects and advantages will readily occur to those skilled in the art. Therefore the invention in its broader aspects is not limited to the specific details, methods, representative devices, and illustrative examples shown and described. Accordingly, departures may be made from such details without departing from the spirit or scope of the general inventive concept as defined by the appended claims and their equivalents.

What is claimed is:

1. A method for communicating messages between a communicator and a central monitoring station over a telecommunications network that includes a voice channel and a control channel, wherein the voice channel conveys data messages and the control channel conveys control messages that manage access to and use of the voice channel, the method comprising the steps of:
   a) obtaining a message at the communicator, the message comprising application specific data;
   b) encoding the message in a sequence of digits associated with a control message to create an encoded message;
   c) encoding a remote feature control request in the sequence of digits associated with the control message to invoke the forwarding of the sequence of digits, including the encoded message, by a local telecommunications switching center upon detecting the remote feature control request;
   d) transmitting the control message and associated sequence of digits to the local telecommunications switching center over the control channel, bypassing the voice channel;
   e) detecting the remote feature control request at the local telecommunications switching center;
   f) forwarding the remote feature control request and the encoded message over a communications channel to the central monitoring station in response to detecting the remote feature control request; and
   g) decoding the encoded message to retrieve the application specific data.

2. The method of claim 1, wherein the step of obtaining a message at the communicator includes the steps of:
   a) transmitting the message from a remote monitoring device to the communicator; and
   b) receiving the message at the communicator.

3. The method of claim 2, wherein the remote monitoring device comprises an alarm system, and the step of receiving the message at the communicator comprises the step of receiving data specifying a status of an alarm system at the communicator.

4. The method of claim 2, wherein the remote monitoring device comprises a tracking system, and the step of receiving the message at the communicator comprises the step of receiving tracking data from the tracking system at the communicator.

5. The method of claim 2, wherein the remote monitoring device comprises a utility meter, and the step of receiving the message at the communicator comprises the step of receiving a reading from the utility meter at the communicator.

6. The method of claim 2, wherein the remote monitoring device is a two-way paging device, and the step of receiving a message at the communicator comprises the step of receiving a response to a page from a two-way paging device.

7. The method of claim 1, wherein the step of encoding the message in a sequence of digits associated with a control message comprises the step of encoding the message in a sequence of digits associated with a call origination message.

8. The method of claim 7, wherein the step of encoding a remote feature control request in the sequence of digits associated with the control message to invoke the forwarding of the sequence of digits, including the encoded message, by a local telecommunications switching center upon detecting the remote feature control request, comprises encoding a remote feature control request in the sequence of digits associated with the call origination message to invoke the forwarding of the sequence of digits, including the encoded message, by the local telecommunications switching center upon detecting the remote feature control request.

9. The method of claim 8, wherein the step of transmitting the control message and the associated sequence of digits to a local telecommunications switching center over the control channel, bypassing the voice channel, comprises the step of transmitting the call origination message and the associated sequence of digits to a serving mobile switching center (MSC) in a cellular radio telecommunications network, over the control channel, bypassing the voice channel.

10. The method of claim 9, wherein the steps of detecting the remote feature control request at the local telecommunications switching center and forwarding the remote feature control request and the encoded message over a communications channel to the central monitoring station in response to detecting the remote feature control request comprises the steps of detecting the remote feature control request at the serving MSC and forwarding the remote feature control request and the encoded message over at least one inter cellular serving area link between the serving MSC and the central monitoring station in response to detecting the remote feature control request.

11. The method of claim 10, wherein the inter cellular serving area link between the serving MSC and the central monitoring station operates according to the signaling system 7 (SS7) protocol standard.

12. A method for communicating messages between a cellular mobile radio (CMR) communications device and a central monitoring device over a cellular telephone network that includes wireless digital traffic channels and inter cellular serving area network channels, wherein the digital traffic channels comprise data traffic channels for transmitting voice and data signals and a control channel for transmitting control signals that manage access to and use of the data traffic channels, the method comprising the steps of:
   a) inserting a message comprising application specific data in a sequence of digits to be transmitted by the CMR communications device in conjunction with a transmission of a call origination message;
   b) encoding a remote feature control request in the sequence of digits to invoke the forwarding of the sequence of digits, including the message, by a serving mobile switching center (MSC) upon detecting the remote feature control request;
   c) transmitting the call origination message and the sequence of digits to the serving MSC over the control channel, bypassing the voice channels, the call origination message specifying a mobile identification number (MIN) identifying the CMR communications device;

d) analyzing the call origination message and the sequence of digits at the serving MSC and detecting the remote feature control request;

e) forwarding the remote feature control request and the message to the central monitoring device over an inter cellular serving area network channel, in response to detecting the remote feature control request, the inter cellular serving area network channel determined by the MIN;

f) receiving the remote feature control request and the message at the central monitoring station; and g) extracting the message comprising application specific data.

13. The method of claim 12, wherein the step of extracting the message comprising application specific data further comprises the step of forwarding the application specific data to an application specific facility.

14. The method of claim 13, comprising the following steps, before the step of inserting a message comprising application specific data in a sequence of digits, a) transmitting the message from a remote monitoring device coupled in communication with CMR communications device; and b) receiving the message at the CMR communications device.

15. The method of claim 14, wherein the remote monitoring device comprises an alarm system, and the step of receiving the message at the CMR communications device comprises the step of receiving data specifying a status of an alarm system at the CMR communications device.

16. The method of claim 14, wherein the remote monitoring device comprises a tracking system, and the step of receiving the message at the CMR communications device comprises the step of receiving tracking data from the tracking system at the CMR communications device.

17. The method of claim 14, wherein the remote monitoring device comprises a utility meter, and the step of receiving the message at the CMR communications device comprises the step of receiving a reading from the utility meter at the CMR communications device.

18. The method of claim 14, wherein the remote monitoring device is a two-way paging device, and the step of receiving a message at the CMR communications device comprises the step of receiving a response to a page at the CMR communications device from the two-way paging device.

19. The method of claim 12, wherein the message comprises a response to a command from the central monitoring device received via a paging network broadcast channel.

20. The method of claim 12, wherein the message comprises a response to a command from the central monitoring device received via a satellite communications channel.

21. The method of claim 12, wherein the message comprises a response to an instruction received from the central monitoring device over a time division multiple access (TDMA) digital broadcast control channel.

22. The method of claim 21, wherein the TDMA digital broadcast control channel operates in accordance with global system for mobile communications (GSM) standards.

23. The method of claim 12, wherein the message comprises a response to an instruction received from the central monitoring device over a code division multiple access (CDMA) digital broadcast control channel.

24. A method for communicating messages between a communicator and a central monitoring station over a mobile satellite communications network that includes a voice channel and a control channel, wherein the voice channel conveys data messages and the control channel conveys control messages that manage access to and use of the voice channel, the method comprising the steps of:

a) obtaining a message at the communicator, the message comprising application specific data;

b) encoding the message in a sequence of digits associated with a control message to create an encoded message;

c) encoding a remote feature control request in the sequence of digits associated with the control message to invoke the forwarding of the sequence of digits, including the encoded message, by a local mobile satellite communications switching center upon detecting the remote feature control request;

d) transmitting the control message and associated sequence of digits to the local mobile satellite communications switching center over the control channel, bypassing the voice channel;

e) detecting the remote feature control request at the local mobile satellite communications switching center;

f) forwarding the remote feature control request and the encoded message over a communications channel to the central monitoring station in response to detecting the remote feature control request; and g) decoding the encoded message to retrieve the application specific data.

25. The method of claim 24, wherein the step of obtaining a message at the communicator includes the steps of:

a) transmitting the message from a remote monitoring device to the communicator; and b) receiving the message at the communicator.

26. The method of claim 25, wherein the remote monitoring device comprises an alarm system, and the step of receiving the message at the communicator comprises the step of receiving data specifying a status of an alarm system at the communicator.

27. The method of claim 25, wherein the remote monitoring device comprises a tracking system, and the step of receiving the message at the communicator comprises the step of receiving tracking data from the tracking system at the communicator.

28. The method of claim 25, wherein the remote monitoring device comprises a utility meter, and the step of receiving the message at the communicator comprises the step of receiving a reading from the utility meter at the communicator.

29. The method of claim 25, wherein the remote monitoring device is a two-way paging device, and the step of receiving a message at the communicator comprises the step of receiving a response to a page from a two-way paging device.

30. The method of claim 24, wherein the step of encoding the message in a sequence of digits associated with a control message comprises the step of encoding the message in a sequence of digits associated with a call origination message.

31. The method of claim 30, wherein the step of encoding a remote feature control request in the sequence of digits associated with the control message to invoke the forwarding of the sequence of digits, including the encoded message, by a local mobile satellite communications switching center upon detecting the remote feature control request, comprises encoding a remote feature control request in the sequence of digits associated with the call origination message to invoke the forwarding of the sequence of digits, including the encoded message, by the local mobile satellite communications switching center upon detecting the remote feature control request.

* * * * *

UNITED STATES PATENT AND TRADEMARK OFFICE
CERTIFICATE OF CORRECTION

PATENT NO. : 5,845,203
DATED : December 1, 1998
INVENTOR(S) : LaDue

It is certified that error appears in the above-identified patent and that said Letters Patent is hereby corrected as shown below:

On the title page:

At item [73] on the first page, please delete the Assignee's name: "Aertis Cormmunications" and insert --Aeris Communications--.

In column 2, at line 28, please delete "anti fraud" and insert --anti-fraud--.

In column 11, at lines 36 and 41, please delete "conformation" and insert --confirmation--.

In column 13, at line 67, please delete "conventional" and insert --conventionally--.

In column 17, at line 44, please delete "users" and insert --user's--.

In column 21 at line 14 of claim 12, please delete "I) receiving" and insert --f) receiving--.

Signed and Sealed this

Twenty-sixth Day of December, 2000

Attest:

Q. TODD DICKINSON

*Attesting Officer*     *Director of Patents and Trademarks*